July 19, 1960 J. K. DUNCAN ET AL 2,945,246
PLASTIC BINDING MACHINE
Filed Jan. 9, 1957 11 Sheets-Sheet 9
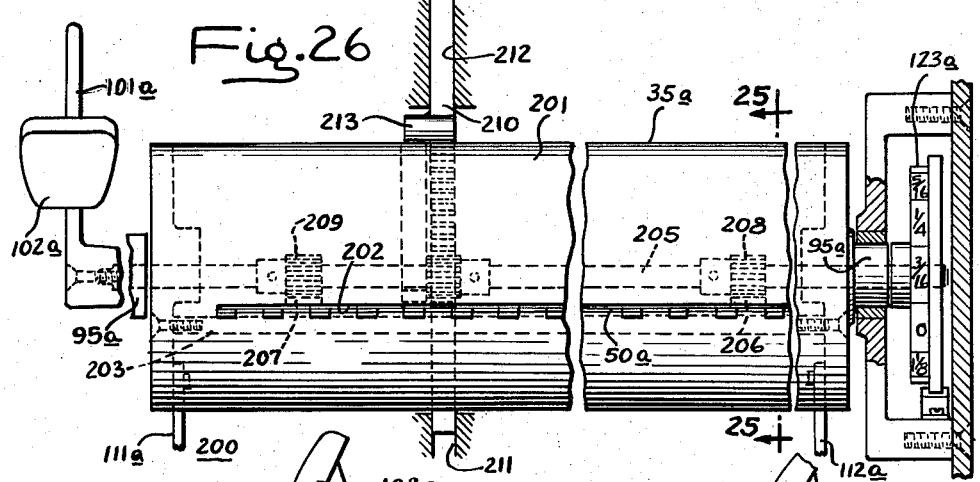
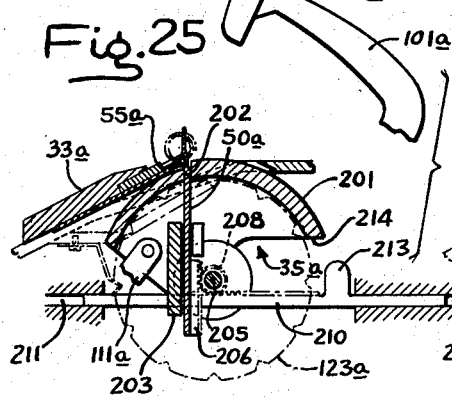
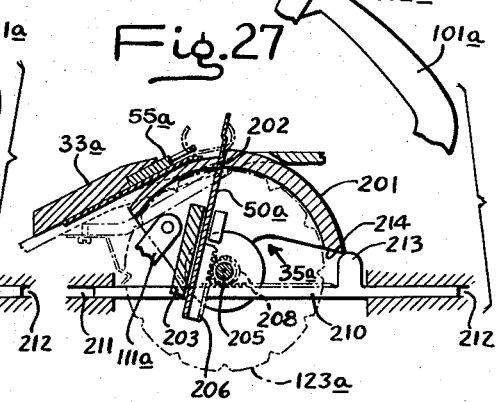
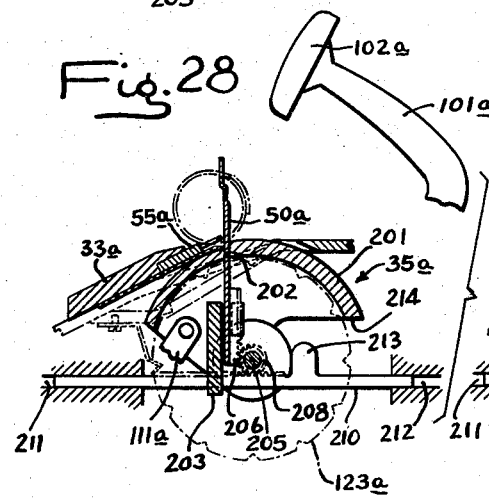
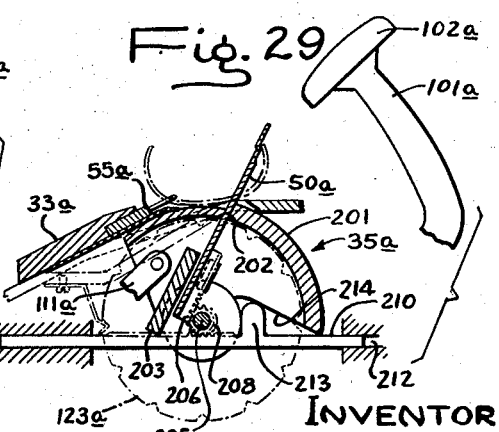
INVENTORS
JAMES K. DUNCAN
JOHN E. JONES
by: Carlson, Pitzner, Hubbard & Wolfe
ATTYS.

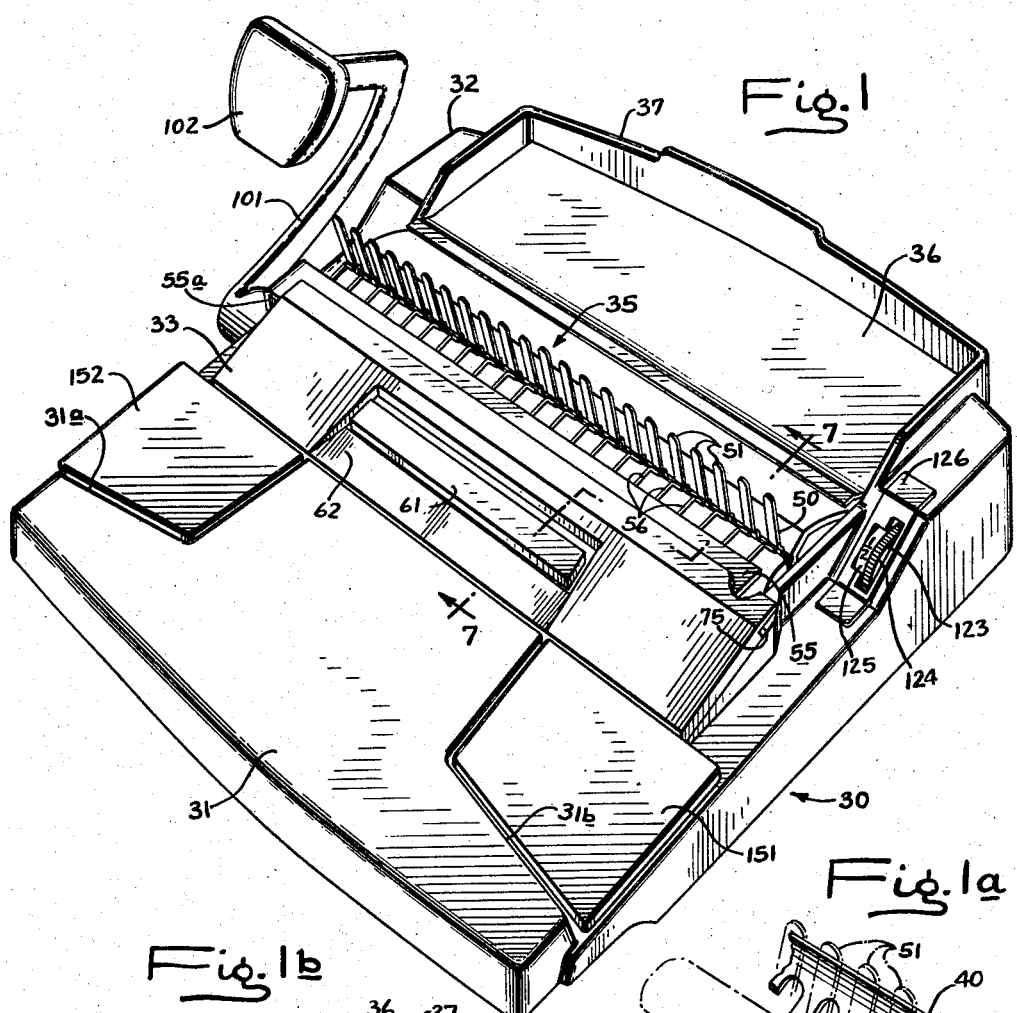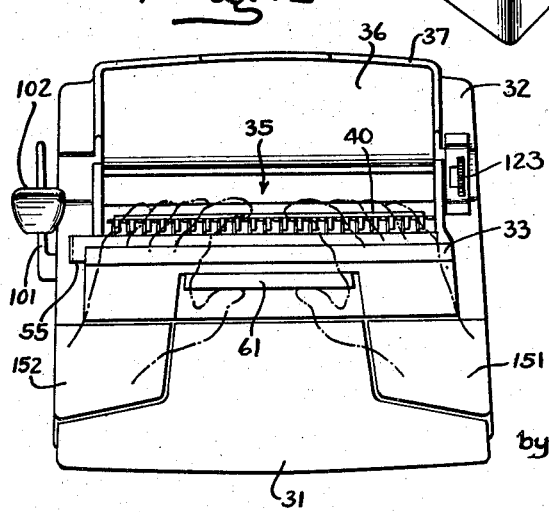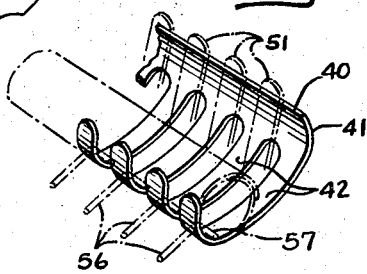

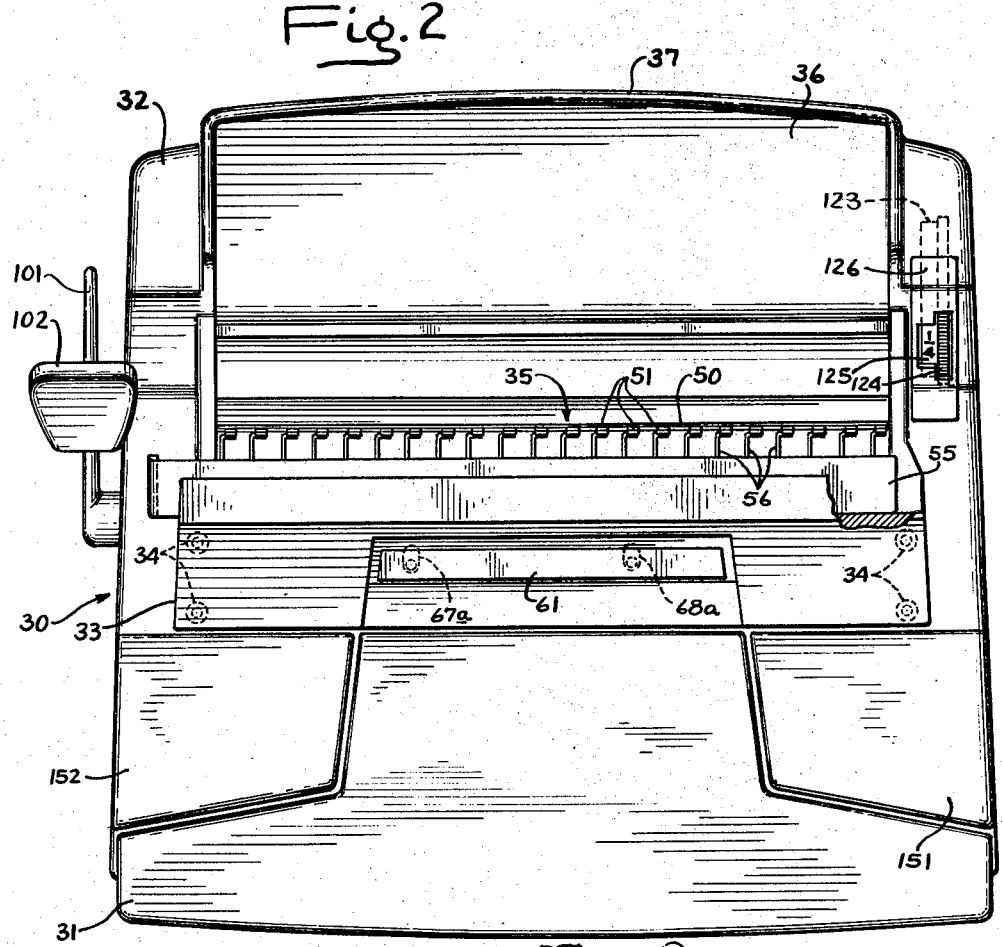
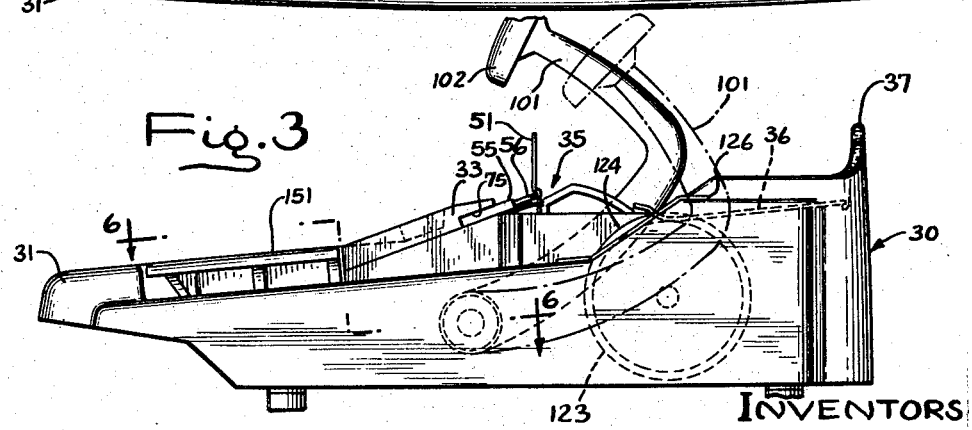

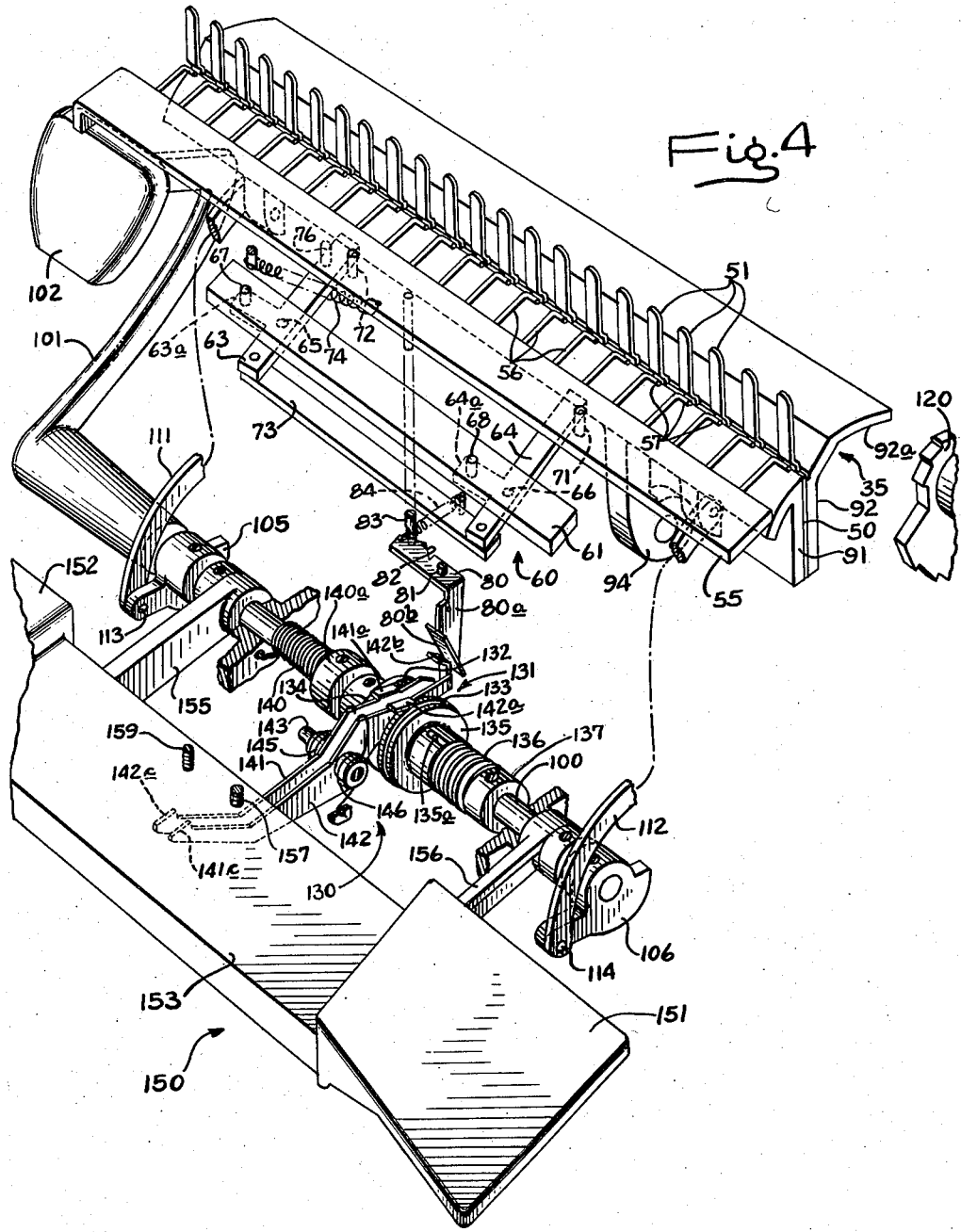

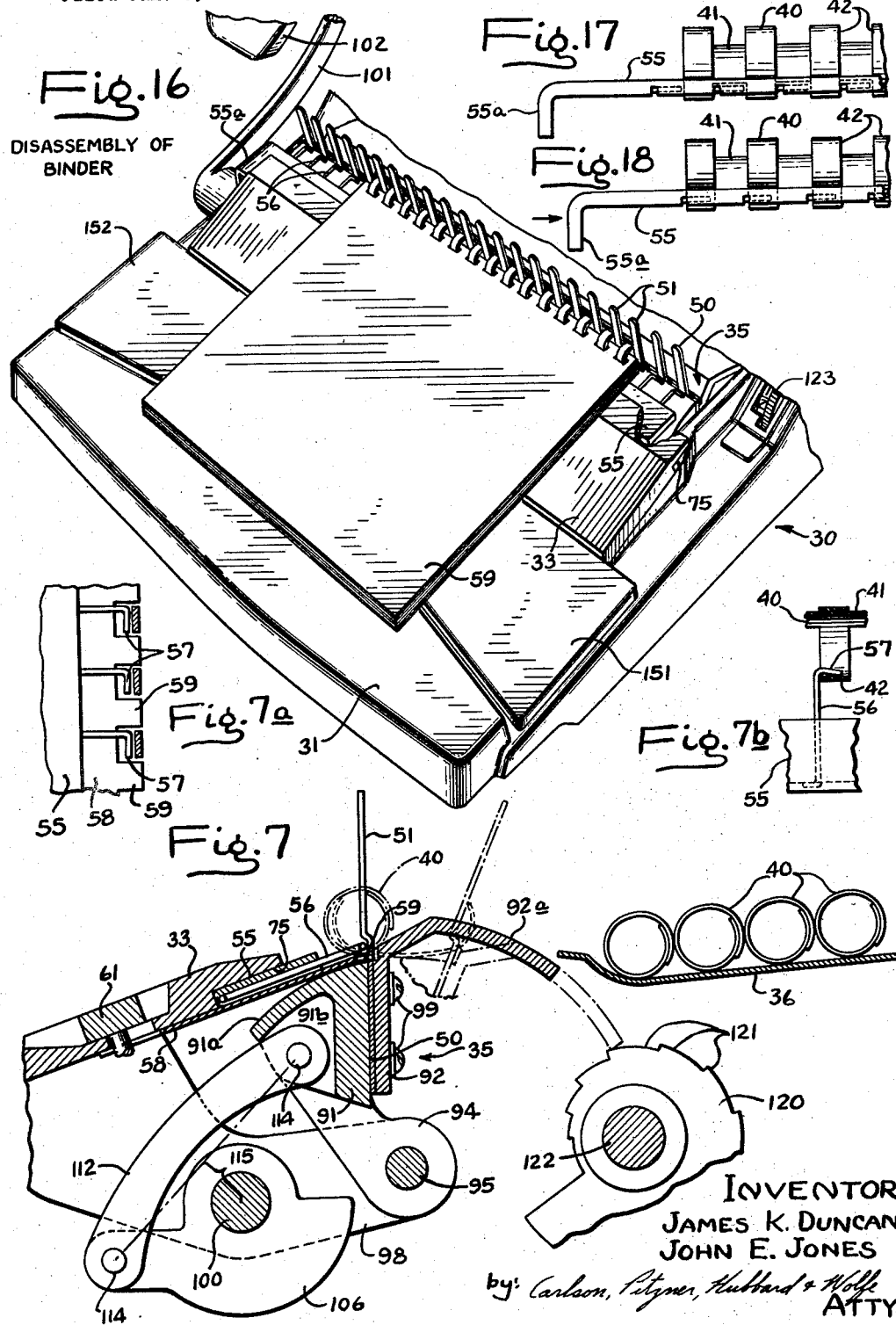

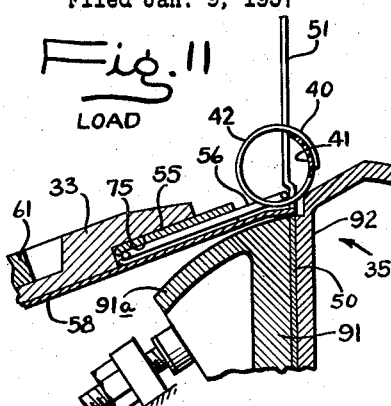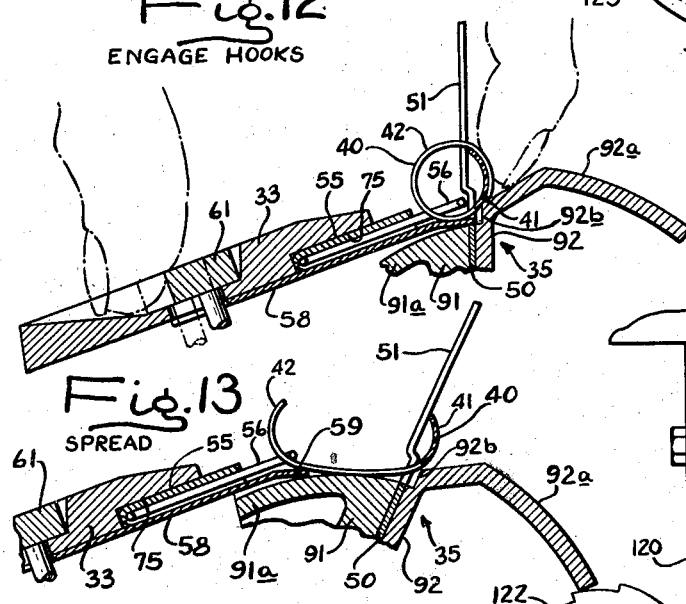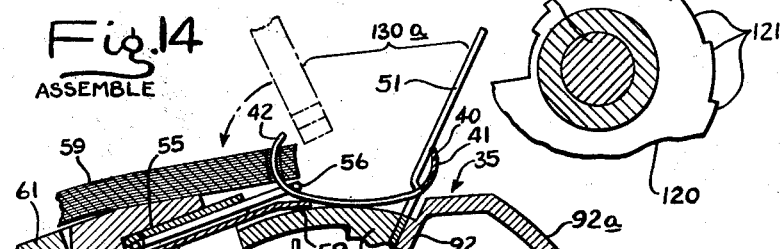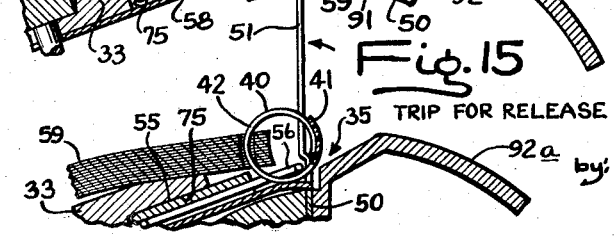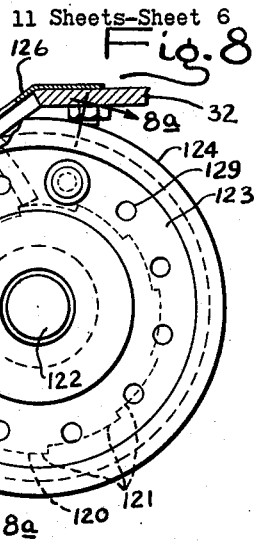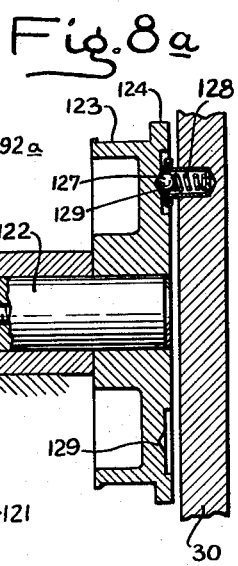

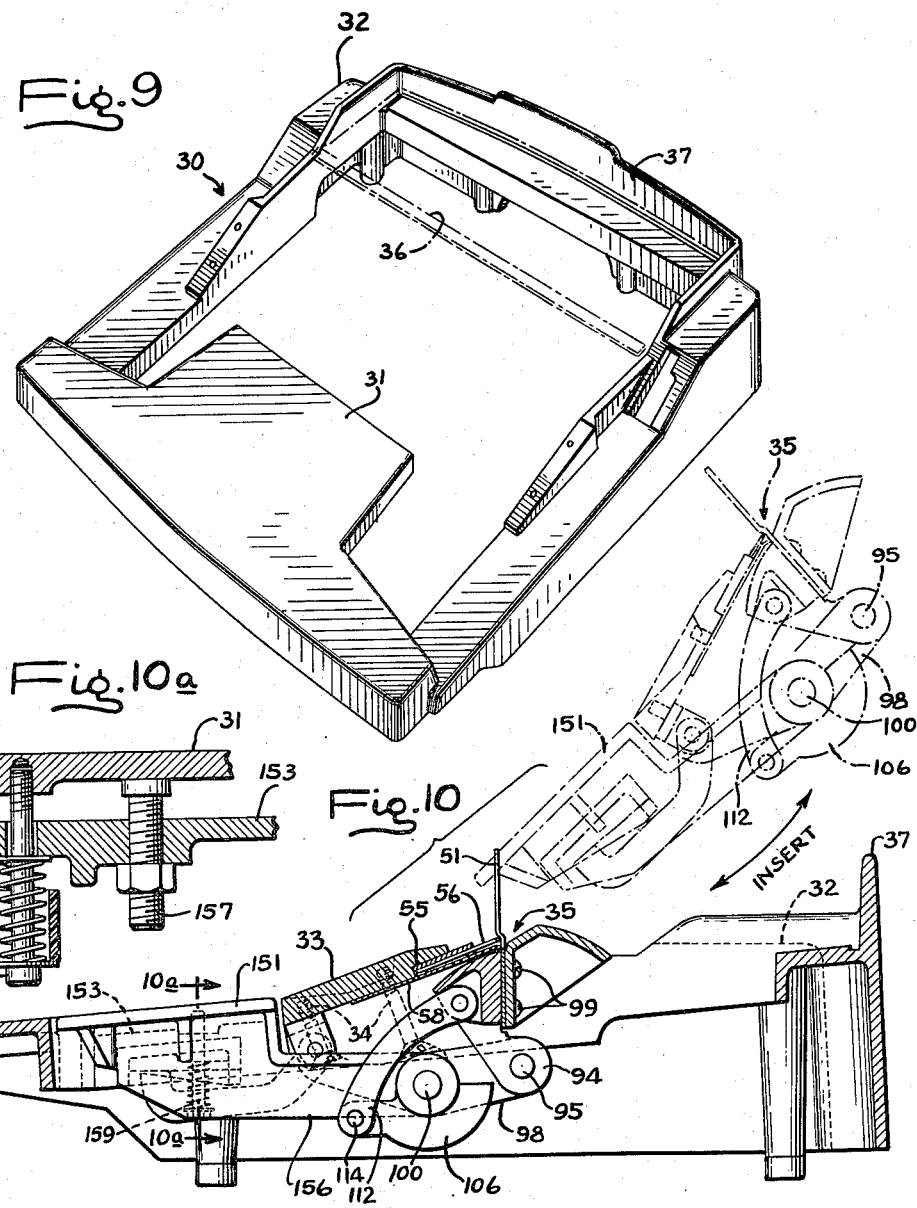

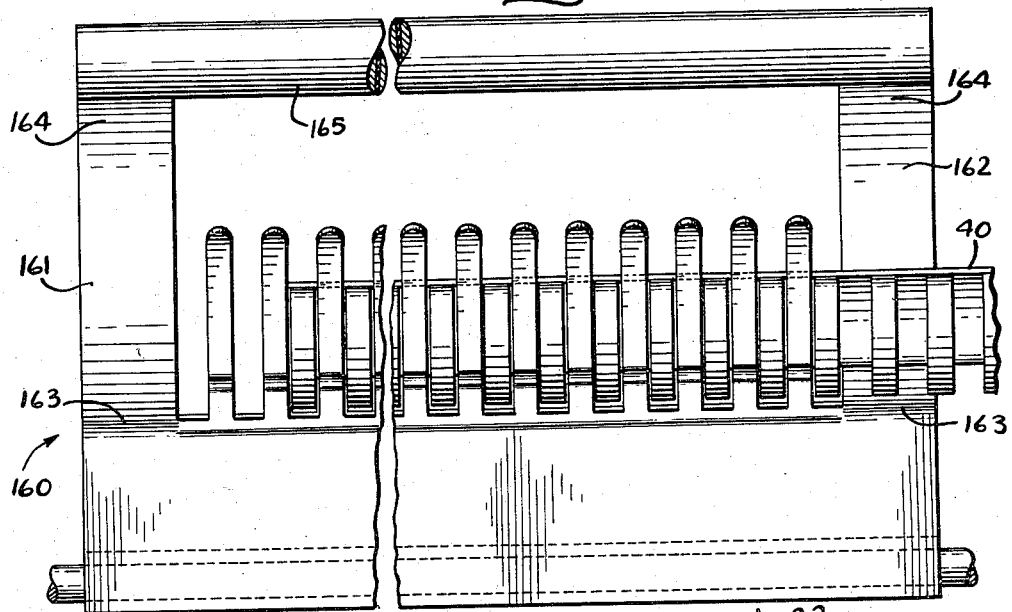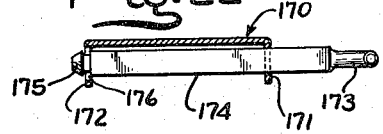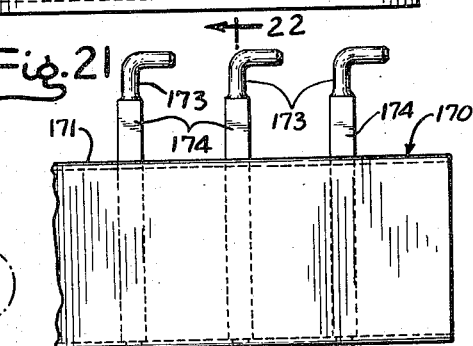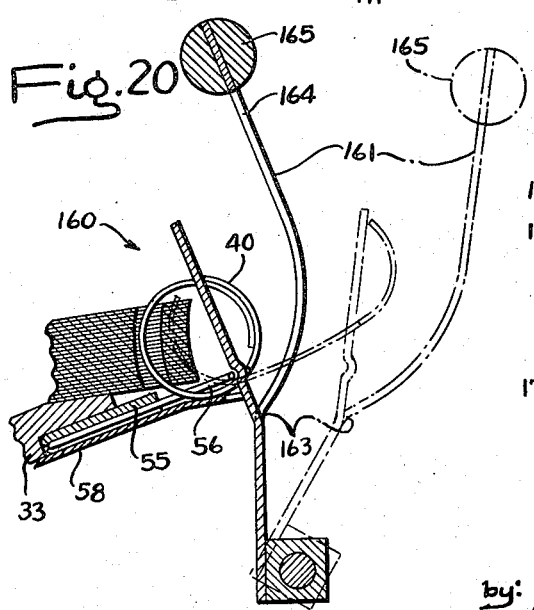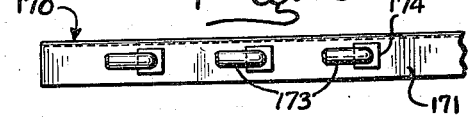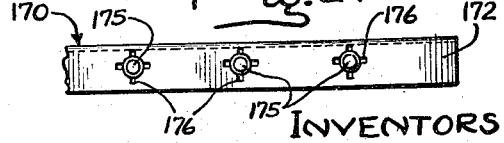

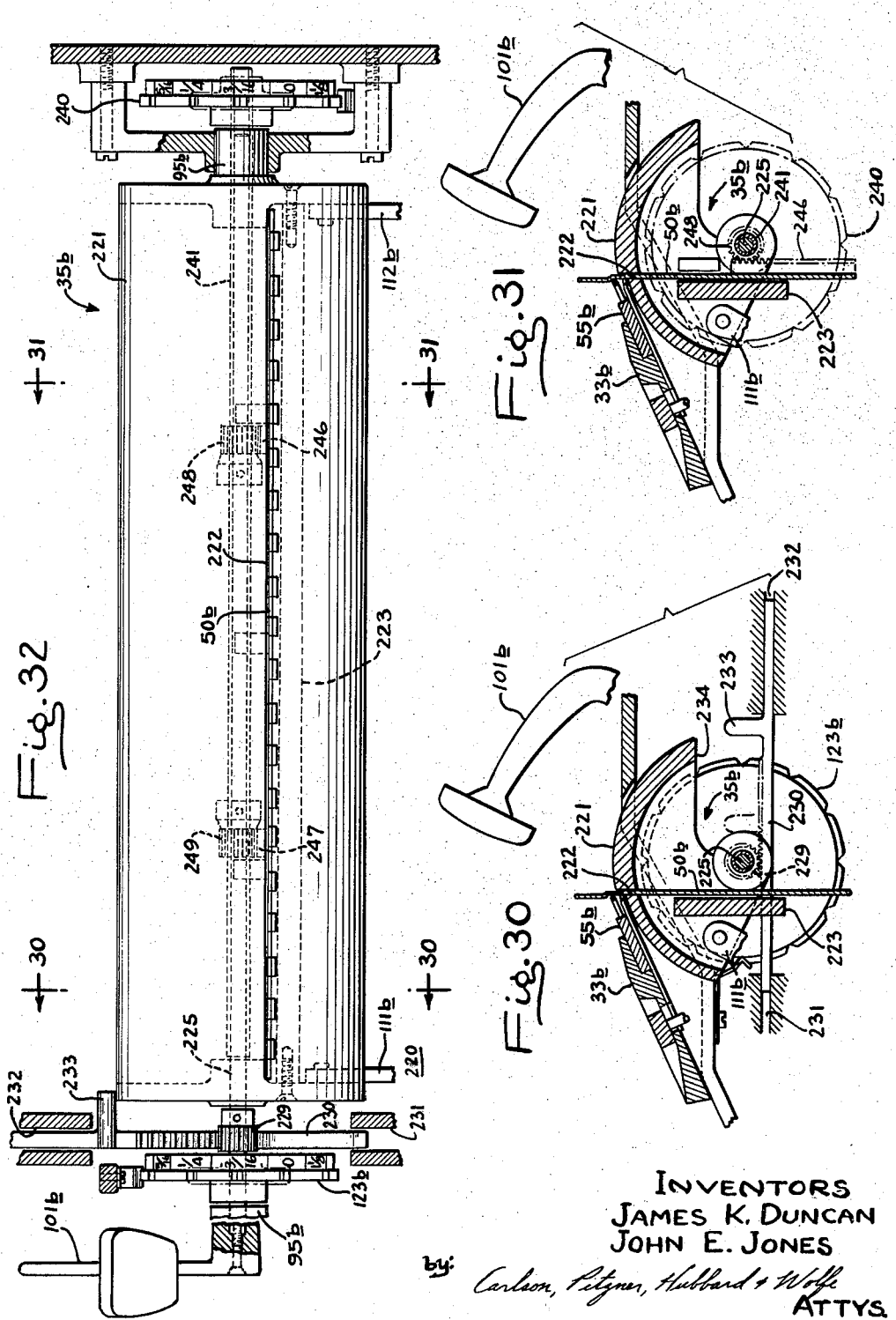

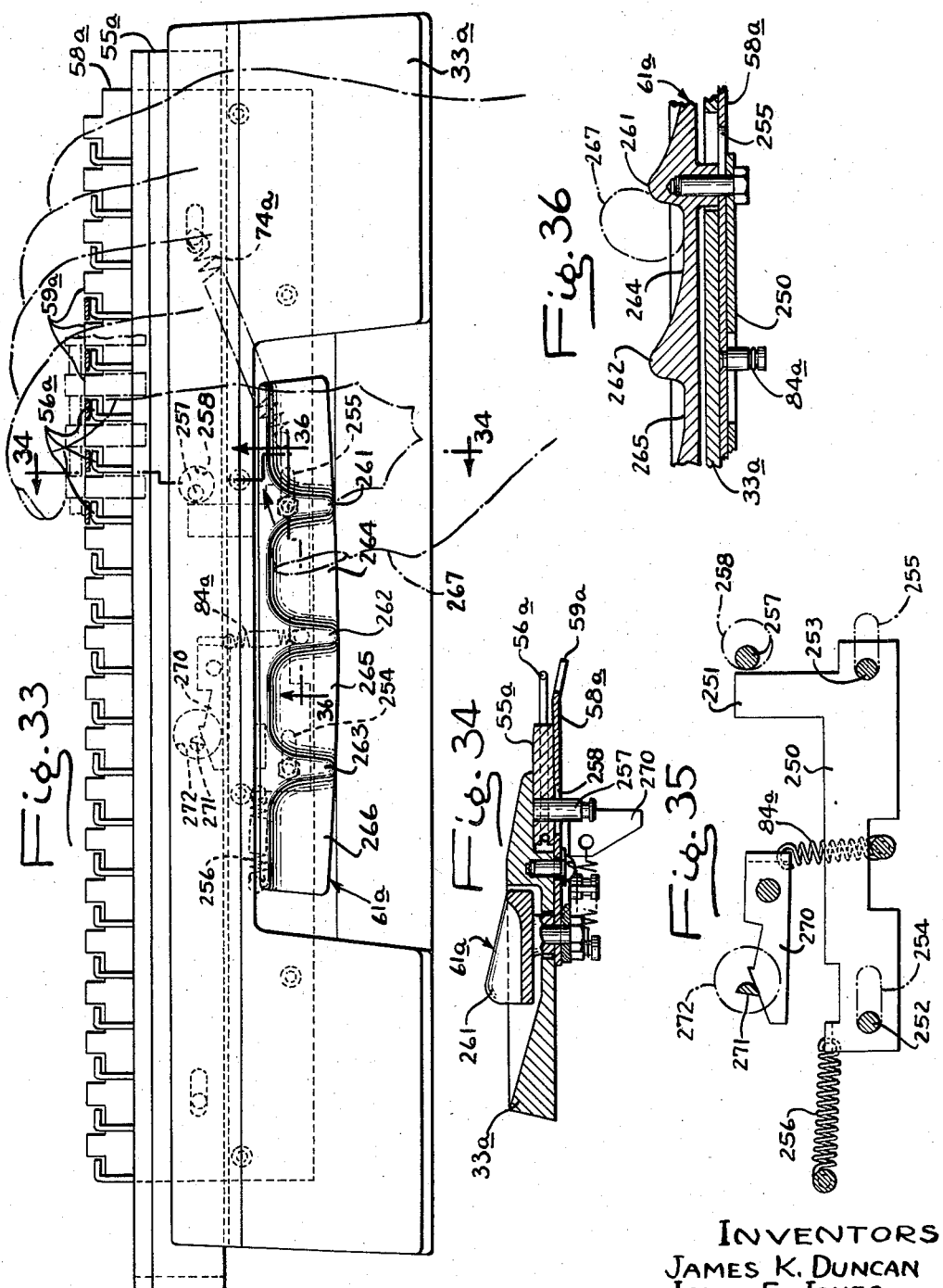

United States Patent Office 2,945,246
Patented July 19, 1960

2,945,246

PLASTIC BINDING MACHINE

James K. Duncan, Park Ridge, and John E. Jones, Wilmette, Ill., assignors, by mesne assignments, to American Photocopy Equipment Company, Evanston, Ill., a corporation of Illinois Filed Jan. 9, 1957, Ser. No. 633,312

21 Claims. (Cl. 11—1)

The present invention relates to binding machines and more particularly to a machine for opening and closing flexible ring bindings for assembly of paper thereon and which is particularly siutable for use with plastic bindings of the general type disclosed in Douvry Patent 1,970,285.

It is a general object of the present invention to provide an improved binding machine for flexible ring bindings which is rapid and convenient to use and which has almost universal application in offices and other business and clerical activities where papers must be bound into booklet form.

It is a related object to provide a binding machine which may be used on a quantity production basis but without strain or fatigue on the part of the operator.

It is another object related to the above to provide a binding machine which may be used successfully by relatively non-skilled office personnel and which makes full use of the natural position and grasping movements of a hand, with the reaction force of the thumb being utilized to set the hooks. More specifically it is an object to provide a binding machine which insures full insertion and firm seating of a binding element against a comb prior to and at the time of setting the hooks thereby insuring that all of the rings will be opened with perfect reliability even in the case of binding elements which are warped or misshapen. It is another specific but related object to provide an improved binding machine of the above type in which the setting of the hooks is accomplished as a separate and preliminary operation completed independently of the subsequent spreading of the binding element.

It is a further object to provide a binding machine in which the comb is so constructed and arranged as to be out of the way during assembly of the paper on the binding element to facilitate natural movements of the hands during assembly and to reduce the possibility of bruised knuckles. In connection with a modified embodiment of the invention novel provision is made for automatically reducing the height of the comb in accordance with the diameter of the binding element being used.

It is still a further object of the invention to provide a binding machine in which opening is effected by minimum operating forces but with a positive action and in which all sizes of bindings may be opened with light pressure on the operating member. It is a more specific object to provide a binding machine in which a novel spreading mechanism is used having a variable mechanical advantage over the operating stroke to obtain positive "break away" of the fingers at a constant operating pressure. It is another object of the invention to provide a binding machine which is capable of use with binding elements over the entire range of commercially available sizes.

It is another object to provide a binding machine in which the operating handle moves backwardly into an out of the way position incident to spreading the binding element thereby enabling use of the machine for bindings having lengths which exceed the nominal capacity of the machine.

It is a further object of the invention to provide a binding machine in which the comb or retaining member swings backwardly to an out the way position thus providing an open "throat" and increased accessibility for placement of the paper on the uncurled fingers. It is a related object to provide a binding machine which enables the binding fingers to be fully uncurled to the desired degree but which nevertheless protects such fingers against overstressing so that the fingers retain their "snap" and reclose tightly against the back portion of the binder when released. In this connection it is an object to provide a binding machine in which the degree of opening of the fingers may be conveniently pre-set in accordance with the nominal diameter of the binding element, but in which the setting means may be manually defeated, i.e., the fingers may be released little by little, by inching the operating lever forwardly for loading of a greater than normal thickness of paper. In one of its aspects it is an object of the invention to provide an improved binding machine in which the paper remains fixed in position during the operating cycle so that pressing the pad of paper down against the work table cannot effect the spreading or hook setting function.

It is still another object of the present invention to provide a binding machine in which the setting or insertion of the hooks comprises a separate manual operation coordinated with the bringing of a binding element into operating position but in which release of the hooks takes place automatically, incident to tripping the mechanism for closure of the fingers. It is a related object to provide a novel automatic tripping arrangement which may be operated by the base portion of either hand of the operator, while leaving the operator free to use both hands in removing a completed booklet from the machine.

In another aspect of the invention it is an object to provide a novel binding machine in which the hooks are stationary during the spreading of the binding thereby enabling use of short hooks and a mounting arrangement therefor which greatly reduces the possibility that the hooks will be bent or broken in the face of repeated hard usage. In a detailed aspect of the invention a novel and simplified hook mounting arrangement is used which enables firm mounting combined with easy assembly and maintenance. It is moreover a detailed object to provide a hook construction which insures that the opening fingers will be steadied and maintained in proper space position without any tendency of the fingers to slip off of the individual hooks.

It is, in addition to the above, an object of the invention to provide a novel frame construction with the operating mechanism all mounted on an easily installed and easily removable subassembly.

Finally, it is an object to provide a binding machine which is inexpensive, inherently durable, and easily serviced and maintained.

Other objects and advantages of the invention will become apparent upon reading the attached detailed description and upon reference to the appended drawings in which:

Figure 1 is a general perspective of a binding machine incorporating the present invention.

Fig. 1a shows a typical binding element used in the machine of Fig. 1.

Fig. 1b is a top view showing the position of the hands of an operator when seating the binding and setting the hooks.

Fig. 2 is a top view of the machine shown in Fig. 1.

Fig. 3 is a right hand side view of the machine shown in Fig. 1.

Fig. 4 is a diagrammatic perspective of the internal mechanism with certain parts distorted in order to facilitate visualization and understanding of the device.

Fig. 7 is a fragmentary section showing the toggle arrangement and taken along the line 7—7 in Fig. 1.

Fig. 7a is a fragmentary top view showing the interfitting relation between the guide plate and comb.

Fig. 7b is a fragment showing an individual hook with the inward angling of the tip position somewhat exaggerated.

Fig. 8 is a fragmentary elevation of the setting knob and the cam-shaped positioning stop.

Fig. 8a is a fragmentary sectional view taken along the the line 8a—8a in Fig. 8.

Fig. 9 is a perspective view of the novel base construction used in the present invention.

Fig. 10 is a vertical section similar to Fig. 7 but showing the subassembly mounting of the operating mechanism and the manner in which the same is bodily removed.

Fig. 10a is a fragmentary section taken along line 10a—10a in Fig. 10.

Fig. 11 is a fragmentary section showing the loading of a binding element.

Fig. 12 is similar to Fig. 11 showing the seating of the binding element in the comb and the setting of the hooks.

Fig. 13 shows the subsequent spreading of the binding element.

Fig. 14 shows the assembling of the paper on the binding fingers.

Fig. 15 illustrates the effect of tripping the mechanism for removal of the bound booklet.

Fig. 16 is a fragmentary perspective showing the use of the machine for spreading the rings of a previously bound booklet.

Figs. 17 and 18 are fragmentary views showing insertion of the hooks into the rings of a bound booklet.

Fig. 19 is a front elevation of a modified form of operating handle.

Fig. 20 is a side view showing the two positions of the operating handle of Fig. 19.

Fig. 21 is a fragmentary view of a modified form of hook bar.

Fig. 22 is a section taken along the line 22—22 in Fig. 21.

Figs. 23 and 24 are fragmentary end views of the hook members.

Fig. 25 is an end elevation, partially diagrammatic, of an automatic comb adjusting mechanism forming a part of the present invention and taken along the line 25—25 in Fig. 26.

Fig. 26 is a plan view of the device shown in Fig. 25 in partial section and with the top frame plate omitted to show the details of construction.

Fig. 27 is a view similar to Fig. 25 showing the spreading of a narrow diameter binding element.

Fig. 28 is similar to Fig. 25 but with the comb and spreading stop adjusted to accommodate a binding element of larger diameter.

Fig. 29 shows the mechanism of Fig. 28 in the spread condition.

Fig. 30 is an end elevation, partially diagrammatic, of a further embodiment somewhat similar to that covered in Figs. 26–29 but including provision for separate adjustment of comb height and degree of spread taken along the line 30—30 in Fig. 32.

Fig. 31 is a view similar to Fig. 30 but taken along the line 31—31 in Fig. 32.

Fig. 32 is a plan view, partially diagrammatic, of the device shown in Figs. 30 and 31 but with the top frame plate omitted to bring out the details of construction.

Fig. 33 is a fragmentary view showing a top plate assembly including alternative means for setting the hooks by thumb reaction and with the operator's hand shown in dot-dash outline.

Fig. 34 is a section taken along the line 34—34 in Fig. 33.

Fig. 35 is a fragment showing the coupling between the thumb bar and the hook bar viewed along the line 35—35 in Fig. 34.

Fig. 36 is a fragmentary section taken along line 36—36 in Fig. 33.

Figure 5:
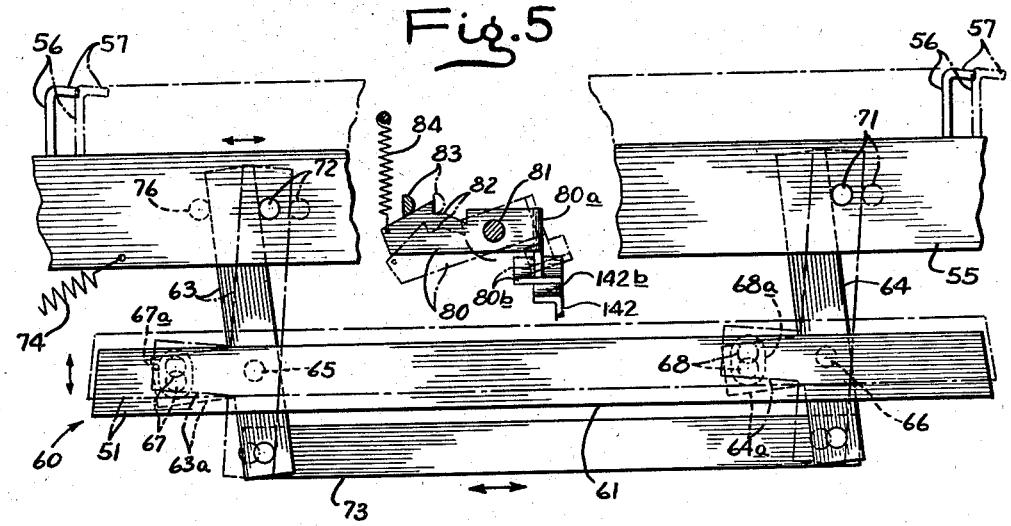
Fig. 5 is a fragmentary plan view of the hook setting and releasing mechanism.

While the invention has been described in connection with certain preferred embodiments, it will be understood that we do not intend to limit the invention to such embodiments but intend to cover such alternate or equivalent contructions as may be included within the spirit and scope of the appended claims.

Turning now to the drawings the present binding machine includes a frame 30 of rectangular outline having a forward work-supporting portion 31, which may be conveniently referred to as a work table, and a rear portion 32 at a slightly higher elevation, the body of the frame 30 being hollow for accommodating the operating mechanism. The frame 30 may be in the form of a light metal die casting or the like. Extending transversely across the mid portion of the frame 30 is a removable top plate 33 held in place by screws 34 and forming a continuation of the work table 31. Rearwardly of the top plate the frame is open to accommodate a transversely extending comb assembly 35. Rearwardly of the comb assembly and supported within the rear portion 32 of the frame is a supporting tray 36 of stainless steel or the like surrounded on three sides by an up-raised fence or ridge 37 defining a shallow receptacle for a group of binding elements 40.

As will be clear to one skilled in this art, these binding elements, which are conventionally formed of plastic, include a backing portion 41 having a series of integral rings in the form of curled fingers 42 (Fig. 1a). For further information regarding the construction and characteristics of the plastic binding elements, reference is made to the prior art and particularly to the above-mentioned Douvry Patent 1,970,285. It will suffice to say that such elements are conventionally formed by cutting the fingers 42 in a flat blank and subsequently curling the fingers and backing, by a rolling operation with application of heat; although such elements may also be made in accordance with copending application Serial 676,179, filed Aug. 5, 1957, by Schaller et al., now U.S. Patent No. 2,910,729. Briefly stated, the purpose of the present machine is to spread or uncurl all of the fingers 42 away from the backing portion 41 so that the tips of the fingers 42 extend upwardly and rearwardly for assembling a stack of punched paper thereon. Subsequently fingers 42 are released so that the tips recurl into a position closely fitted inside of the backing portion 41 to produce a completed booklet which is attractive and in which all of the pages are securely bound together.

Extending upwardly from the frame 30 from the comb assembly 35 is a comb 50 having a series of teeth 51 which are spaced to register with the openings between the fingers 42 of the binding element. Arranged in front of the comb 50 is a hook bar 55 having a series of hooks 56 lying closely adjacent the teeth 51 of the comb, each of the hooks having a transversely bent tip portion 57, the tip portions being positioned in alinement with one another (Fig. 7a). The hook bar 55 is slidably supported on a stationary guide plate 58 which is secured to the underside of the top plate 33 and which has a forward edge 59 which projects forwardly of the top plate for a reason which will be covered at a later point. In use, a binding element 40 is seated against the back of the comb with the curled fingers projecting forwardly between the teeth thereof, means being provided, as set forth below, for inserting the hooks endwise into the fingers and for spreading the comb relative to the hooks in order to uncurl the fingers 42 as shown in dotted outline in Fig. 1a.

In accordance with one of the aspects of the present invention the teeth of the comb 50 are of such height that they may be readily bridged by the hands of an operator and means, associated with the work table of the machine and positioned to be operated by one or both of the operator's thumbs are provided for setting the hooks into the curled fingers of the binding element at the same time that fingertip pressure is applied along the backing portion of the element. In the preferred embodiment illustrated in the drawings, the hook setting arrangement 60 includes a thumb operated bar 61 which extends transversely across the work table and is spaced forwardly from the comb 50 in the path of movement of the thumbs, the bar 61 being mounted for movement rearwardly in response to the normal squeezing or reaction pressure of the thumbs. The position of the operator's hands during this operation is shown in Fig. 1b. This procedure, as will become apparent, insures that all portions of the binding element are firmly seated at the time that the hooks are moved thereby enabling positive opening of all of the fingers of the binding element even where binding elements are used which have become seriously warped or twisted in storage.

For access, thumb operated bar 61 is, as shown in Fig. 1, mounted in a depression 62 of wedge-shaped cross section formed in the top plate 33, so that the bar is readily engaged by the thumbs even though all portions of the bar are below the surface of the top plate 33 on which the paper rests during the binding operation.

In order to understand the linkage employed for coupling the operating bar 61, to the hook bar 55, reference is made to Figs. 4 and 5. Here it will be noted that a double bell crank arrangement is used comprising bell crank levers 63, 64 which are each pivoted at their central portion on pivots 65, 66 secured to the underside of the plate 33. The bell cranks 63, 64 include crank arms 63a, 64a respectively, which extend to the left and which are pinned at their outer ends to the bar 61 by pivot pins 67, 68. These pivot pins project upwardly through the top plate 33 through clearance holes 67a, 68a respectively.

The forward ends of the bell cranks engage the hook bar 55 by means of pins 71, 72 on the latter. Thus the two bell cranks 63, 64 form the sides of a parallelogram linkage which is completed by a link 73. A spring 74 secured to the hook bar 55 and anchored to the frame serves to bias the hook bar toward its disengaged or left hand position. The hook bar 55 is mounted for endwise sliding movement in a slot 75 formed on the underside of the top plate 33, and stop pin 76, also on the underside of the top plate, defines the initial position of the hook bar in which the hooks are alined with and thus shielded by the teeth 51 of the comb. The opposite or inserted position of the hook bar is determined by bending down the left hand end of the hook bar so that it strikes the casing upon full insertion of the hooks.

In the hook-setting operation a binding element is drawn forwardly from the storage recess into a registered position between the teeth, and as the finger tips apply distributed pressure therealong, the reactive thumb pressure resulting from the natural grasping movement of the hand is applied to the forward edge of the hook-setting bar 61. The resulting rearward movement causes both of the bell cranks 63, 64 to be rotated clockwise about their pivots 65, 66, with the result that the hook bar 55 is moved endwise from the initial position shown in Fig. 5, to the hook-engaging position shown by the dot-dash lines in the same figure. In carrying out the present invention, the hook bar is temporarily maintained in the latter position by means of a releasable latch 80 which is pivoted on the underside of the top plate 33 on a pivot 81. The latch 80 is notched as indicated at 82 for engaging a dog in the form of a flatted pin 83 which extends downwardly from the hook bar 55. The latch is normally biased to its engaging position by means of a spring 84 suitably anchored to the frame. It will be apparent that as the hook bar 55 moves to the right hand or locking position the dog 83 thereon will be captured by the notch 82 formed in the latch so that when the hook setting member 61 is released, the hook bar will be maintained in its engaging position with each ring of the binder firmly caught by one of the hooks. After the latch is engaged, finger tip pressure may be released from the binding element leaving the hands of the operator free for the subsequent spreading and assembling of paper on the binder.

In accordance with a further aspect of the present invention, the hooks are kept stationary during the spreading of the binder, and the comb member 50 is mounted for movement rearwardly, carrying the backing portion of the binding element rearward, with the binder fingers uncurling about their respective hooks, so that their tips are presented for assembly with the punched paper. In the present device, the comb is pivoted for swinging about an axis parallel to the comb and spaced below it.

In order to understand more clearly the construction and mounting of the comb 50, reference may be made to Figs. 4 and 7. Here it will be noted that the comb assembly 35 includes a front portion 91 and a rear portion 92 with the comb 50 clamped between them and mounted on spaced supporting arms 93, 94. The arms 93, 94 are both pivoted on a longitudinal shaft 95, mounted on brackets 97, 98 which form a part of the top plate 33. The assembly consisting of the comb and the members 91, 92 are securely clamped together by means of screws 99 for swinging rearwardly as a unit about the shaft 95. As will be discussed later in greater detail, the top surface of the member 91 forms an arcuate forwardly extending apron 91a which serves, in the case of large diameter bindings, as a support for the fingers as they are uncurled about the respective hooks incident to the spreading operation. Furthermore, and in accordance with another aspect of the invention, the member 92 is provided with a second arcuate apron 92a which extends rearwardly from the comb for the purpose of bridging the space between the binding receptacle or tray 36 and the comb when the comb is in its initial position, the apron being concentric with the axis of rotation. Thus, the entire comb member as viewed in Fig. 7 is more or less T shaped in cross section with pivoting taking place about the base of the T. As will be discussed in further detail the present construction enables the binder to be guided by the finger tips of the operator from the receptacle across the surface 92a and into engagement with the comb with a single sweeping movement. When the comb is swung backwardly about its shaft, the arcuate surface 92a simply passes under the lip of the tray 36 into an out-of-the-way position.

It will be apparent that the two aprons 91a, 92a taken together bridge the space between the top plate 33 and the tray 36 for all positions of the comb thus shielding the mechanism from entry of dirt and producing a more attractive and workmanlike appearance.

Figure 6:
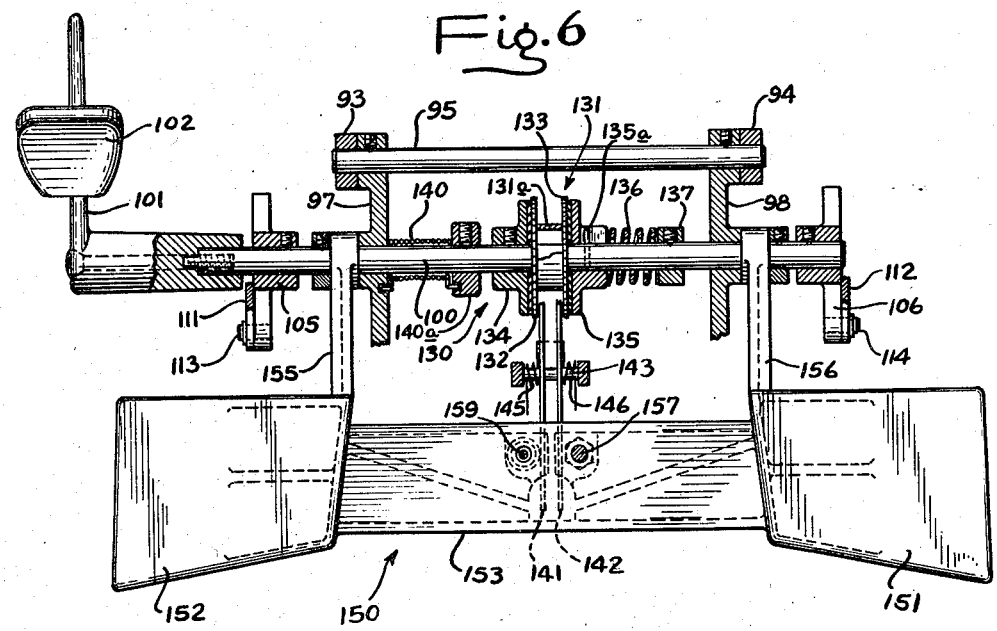
Fig. 6 is a section taken through a main operating shaft and looking along the line 6—6 in Fig. 3.

Prior to discussing the spreading operation, it will be helpful to have clearly in mind the mechanism employed for swinging the comb backwardly, particular reference being made to Figs. 4, 6 and 7. For this purpose an operating shaft 100 is provided which is preferably mounted on the same supporting brackets 97, 98 which support the shaft 95 previously referred to. Secured to one end of this shaft and projecting through an opening in the casing is a manual operator having an arm 101 and a pad 102. The arm 101 is preferably curved rearwardly in the shape of a dog leg in order to provide clearance at the end of the comb and to enable a binder element to extend outboard where a binder element is used which exceeds the nominal capacity of the machine, as will be discussed more fully below. Fixed to the shaft 100 near its ends are cranks 105, 106, these cranks are linked to the comb assembly 35 by means of curved links 111, 112, pinned to the arms 93, 94 forming a part of the comb assembly, the pivot points for the link 112 being indicated at 113, 114 respectively. In carrying out the invention the cranks 105, 106 are arranged in folded or V formation with respect to the links 111, 112. This has the effect of reducing the effective lever arm of the cranks 105, 106 to that shown at 115 in Fig. 7. The mechanical advantage afforded by the manual operator 101 is approximately doubled at the beginning of the stroke thus providing a high "break away" torque. The latter has been found to be desirable for initially separating the tips of the fingers of the binder from the backing portion thereof. In this connection it will be understood by one skilled in the art that the tips of the fingers of a conventional plastic binding element are in overlapping relation with respect to the curved cross section of the backing portion, either on the outside or on the inside and with the tips thus locked in place a substantial force is often necessary to get them free. The high mechanical advantage afforded by the folded cranks and connecting links supplies the necessary torque without any undue application of force by the machine operator and a light uniform force on the lever is all that is necessary.

In order to insure against a ring slipping free of its hook during the above operation, each of the hooks is so constructed as to concentrate the "pulling" force at its tip. In the present instance this is accomplished by bending the tip portion 57 slightly beyond 90° as shown in Fig. 7b. This causes the inner edge of the finger to ride the shank of the hook which produces precise positioning without necessity for recourse to elaborate aligning arrangements.

Having understood the means used for swinging the comb assembly backwardly about its axis 95, attention may next be given to the adjustable means employed for stopping rearward movement of the comb and thus determining the amount of spread of the fingers of the binding element. In accordance with one of the more detailed aspects of the invention, an adjustable positioning cam is used which is placed in the path of movement of the rearwardly extending skirt portion 92a of the comb assembly 35. As shown in Figs. 8 and 8a, the positioning cam indicated at 120 has a series of steps 121 formed thereon of graduated radius. Rotation of the cam takes place about a shaft 122 which is suitably journaled in the frame of the machine. Connected to the outer end of the shaft 122 is a setting knob 123 having a narrowed rim portion 124 and an index or scale 125. The index 125 is calibrated in terms of the nominal diameter of the binding element and is viewed through an aperture provided in a finishing or escutcheon plate 126. The narrowed rim 124 is knurled to facilitate setting by finger tip pressure. Preferably a detent is used so that the adjusting knob "clicks" between the various nominal settings within the normal commercial range of ¼ to 1⅛ inches. Such detent includes a ball 127 and spring 128, the ball engaging a selected dimple 129 in the side of the knob. While the index is calibrated only in terms of the nominal dimensions, the detent is preferably so constructed that intermediate settings are available in order to accommodate a given nominal size to greater or lesser amounts of paper, a feature readily appreciated by one skilled in this art. Because the cam 120 is stepped rather than continuous, perfect consistency in the amount of spread is assured. It will be apparent to one skilled in the art that the scale 125 may be doubly calibrated for narrow and wide-backed bindings respectively.

The operation of the spreading mechanism and the adjustable stop thus far described will become apparent upon reviewing a typical spreading procedure as shown in Figs. 11 to 15 inclusive. At the outset a binding is scooped from the receptacle or tray 36 with the finger tips and drawn upwardly along the apron into loading position. Here the binding element is registered with the teeth of the comb 50 with the backing portion thereof lying to the rear of the comb. As a next step the binding is pressed into seated position on the comb and the hooks are simultaneously set by thumb reaction as shown in Fig. 12. As stated, the backing portion 41 is pressed by the finger tips against the comb 50 all along its length so that each of the rings or fingers of the binding element extends forwardly the maximum amount and in proper position for insertion of the hooks. Thumb reaction is then employed to operate the hook setting bar or thumb bar 61, swinging the parallelogram linkage into the position shown in Fig. 5 and setting all of the hooks, the hook bar being retained in the hook-engaging position by means of the latch 80 previously referred to. This frees the hands of the operator so that pressure may be applied to the arm 101, the comb being thus swung rearwardly until the comb assembly is bottomed on a pre-selected step on the cam 120, the setting of the latter depending upon the nominal diameter of the binding element being used. Spreading of the binding element is accompanied by uncurling of the fingers about the hooks as shown in Fig. 13, the binding element there shown being fully spread. With the binding element fully spread, the tips of the fingers thereof are upwardly presented, and facing away from the operator.

As was brought out in Figs. 11–15 the present arrangement not only enables firm seating of the backing element behind the comb but also insures that each of the fingers is uncurled to precisely the right degree, that is, sufficient to provide adequate "openness" for the threading of the paper onto the fingers while avoiding excessive straightening or flattening of the fingers which is characteristic of conventional machines and which prevents the fingers from restoring themselves to their original curled position upon subsequent release.

Thus, turning attention to the backing portion of the binding element, it will be noted that the lower edge thereof (Fig. 13) is wedgingly seated in a longitudinal groove 92b formed in the member 92 immediately behind the comb. This not only insures seating of the backing all along its length but it also insures that each of the fingers lies in a uniform starting position for proper curvature when the binding element is spread apart. In carrying out the invention an auxiliary stationary supporting ledge is provided lying below the hooks and projecting a small amount forwardly thereof for supporting the uncurling fingers while permitting the fingers to maintain a predetermined amount of curl as the fingers are spread away from the backing portion. This will be made clear by reference to Fig. 13. Here it will be noted that the supporting ledge 59 is integral with the guide plate 58 which is secured to the underside of the top plate 33. The front edge of the guide plate is preferably formed with square teeth which register with the openings between the teeth of the comb. Such register enables the hooks to be brought up almost into contact with the teeth of the comb when the comb assembly is in its initial position illustrated in Fig. 11. Since each hook is spaced a constant distance from the ledge 59, the opening between the hook and ledge forms a restricted gate which not only restrains the binding finger but which insures that it is uncurled with a certain minimum degree of curvature. In the case of binding elements of small and medium size, the supporting ledge 59 supports the uncurling fingers so that they do not bear upon the apron 91a of the comb assembly. This is desirable for such bindings since it insures that the central portion of the fingers will not be excessively flattened. However, in the case of binding elements of large diameter, contact does take place between the apron 91a and the binding fingers. Such contact is not undesirable in the case of the large elements since the normal curvature is less and since the fingers can therefore tolerate any temporary flattening out which may occur without exceeding the elastic limit.

Assembly of the paper on the fingers is facilitated in the present device by the fact that the comb is not only moved backwardly but also rotated backwardly into an out of the way position in which the teeth of the comb are angled so as to leave a maximum throat space indicated at 130a in Fig. 14. In practice the pad of punched paper is grasped along its lateral edges with the thumbs "under" the pad adjacent the punched holes and with the finger tips on top. The pad is rotated away from the operator so that the thumbs and the punched holes are visible, following which the punched edge is threaded on the tips of the fingers (Fig. 14). This is a natural, easily executed movement, and the clearance provided by the present structure makes it unlikely indeed that the operator will scrape his knuckles on the ends of the comb teeth. After the paper has been assembled on the tips of the fingers, with the pad lying flatly on the work table 31, the machine is in readiness for releasing the comb and recurling of the fingers, in order to hold the paper pad in place.

In carrying out the invention means are provided for automatically latching the comb assembly in its rearmost position so that the manual operator 101 may be released following normal assembly of paper on the tips of the fingers, while, nevertheless, permitting the latch to be defeated so that the comb may be inched forwardly to enable a greater than normal amount of paper to be placed in the binder. To understand the construction of the spreading latch arrangement, reference will be made to Figs. 4 and 6. Here it will be noted that the main operating shaft 100 carries at its center a ratchet mechanism 130 having a ratchet wheel assembly 131 which is frictionally engaged to the shaft 100 as described. The ratchet wheel assembly preferably consists of two ratchet wheels 132, 133 joined by a hub 131a. Arranged on opposite sides of the ratchet wheel 131 are friction disks 134, 135 each of which has a facing of friction material. The friction disk 134 is secured to the shaft 100 by a suitable set screw while the friction disk 135 is axially movable, having a pin-and-slot connection with the shaft 100, the pin being indicated at 135a.

Compressive force is applied to the assembly by means of a stiff expansion spring 136 which surrounds the shaft 100 and which is axially anchored by a collar 137 fixed to the shaft. Thus the friction developed between the members by the force of the spring 136 will cause the ratchet wheel assembly to be effectively secured to, and movable with, the shaft 100 during normal operation of the machine. For the purpose of biasing the comb assembly into the initial or forward position, a coil spring 140 is provided which surrounds the shaft 100, being anchored with respect to the frame at one end and connected at the other to a collar 140a which is secured to the shaft by a suitable set screw. It will be apparent that the torque exerted by the spring 140 must be overcome when moving the manual operator 101 backwardly during the spreading operation; however, the spring force is relatively light and the spring rate is such as to make the restoring force substantially constant over the entire stroke.

For the purpose of engaging the ratchet wheels 132, 133, pivoted pawl levers 141, 142 are provided having outwardly bent tabs 141a, 142a, the leading edges of which engage the teeth on the wheels. The pawl levers are both centrally pivoted on a shaft 143 on the underside of the plate 33 and are biased into the engaging position by means of coil springs 145, 146 which surround the shaft (Fig. 4). The ratchet wheels 132, 133 secured to the collar 131a are rotationally off-set from one another by an amount equal to one-half the tooth spacing so that the pawl levers 141, 142 act alternately, thus effectively doubling the number of ratchet teeth. This substantially improves the accuracy of the degree of spread by minimizing the retrograde movement of the comb assembly which occurs when the operating member 101 is released. However, since the individual teeth are large, the pawls each take a substantial "bite" reducing the amount of wear at the tips of the teeth and increasing the reliability of operation over long periods of time.

No slippage takes place in the friction connection described above under normal operation, since for each setting of the positioning cam 120 the fingers of the corresponding binding element are uncurled just the right amount for assembly thereon of a pad of paper of normal thickness, without further care on the part of the operator. However, when more than a rated amount of paper is to be used, threading of the punched paper may conveniently take place in two or more steps. Using the normal setting of the cam, a portion of the paper is threaded onto the fingers. The operating arm 101 may then be inched forwardly a small amount, overcoming the force of the friction connection and defeating the ratchet. This causes the fingers to be partially curled, which extends the tips thereof an additional amount through the pad of paper, following which all or part of the remainder may be added. The mechanism can then be tripped just as in normal operation as covered below.

In accordance with one of the important aspects of the present invention, novel tripping means are provided in the present machine for simultaneously restoring the comb to its initial or forward position and for disengaging the hooks from the respective binder rings. The simultaneous release of the hook bar is effected in the present instance by coupling the pawl lever 142 to the release latch 80 as shown in Fig. 4. This coupling is brought about by extending the pawl lever 142 forwardly, the tip thereof being bent over to provide an inclined camming surface 142b. Moreover, the release latch 80 is bent downwardly at a point spaced from its pivot point to provide a downwardly extending arm 80a having a flat face 80b. In operation, therefore, rotation of the pawl levers 141, 142 act to release the ratchet wheels 132, 133 to permit the comb to move forwardly under the urging of spring 140, thus recurling the fingers (Fig. 15). Immediately thereafter, and as part of the same movement, contact takes place between members 80b and 142b on the latch and lever 142 respectively. The camming nature of this contact causes the release latch to be rotated about its pivot in a releasing direction thereby freeing the flattened pin 83 from the notch 82 and permitting the hook bar 55 to move to its left hand or disengaged position under the urging of the hook bar return spring 74.

It is another detailed feature of the present invention that the pawl levers are actuated by a release pad which is associated with the work table 31 and which forms a smooth continuation thereof. As shown to advantage in Figs. 1, 2, and 4, the release pad member indicated at 150 extends transversely of the work table 31 having a right hand pad portion 151, a left hand pad portion 152 and a downwardly off-set central portion 153. The work table 31 is cut out as indicated at 31a, 31b to form apertures for the upward projection of the release pads 151, 152. In order to mount the member 150 for vertical movement, the same is provided with integral rearwardly extending arms 155, 156 which have sleeves at their forward ends for receiving the main operating shaft 100. The mounting arrangement insures substantially straight up and down movement of the pads 151, 152 with freedom of any cocking of binding. The normal position of the release member 150 is defined by an adjustable stop member in the form of a stud 157 and bias is provided by a spring 158 on a bolt 159 (Fig. 10a). The limit of downward movement is established by a stop in the form of a short length of tubing 158a surrounding the spring 158. Coupling between the release pads and the pawl levers 141, 142 is obtained simply by extending the pawl levers forwardly to provide tip portions 141c and 142c which engage the underside of the member 150.

It will be apparent that placing the operating pads 151, 152 along the respective sides of the work table and at the forward portion thereof enables the pads to be conveniently struck by the base portion of either of the hands of the operator. Thus release of the mechanism with subsequent removal of the binder may be accomplished with a swift downward and upward movement of the operator's hand or hands without releasing his grip on the paper.

In the paragraphs above a detailed sequence of operations has been given in connection with each of the mechanical sub-assemblies, but it will be apparent to one skilled in the art that the operating sequence flows quickly and smoothly with only three integrated movements required on the part of the operator. The first is the secure seating of the backing member in the comb along its entire length combined with a setting of the hooks by the reaction pressure of the thumbs. The second movement is the pressing backwardly on the operating lever until it strikes the pre-selected stop. The third movement is the assembling of the paper, tripping and removal with a continuous motion making the present machine ideally suited for rapid assembly on a production line basis.

In practice even the above operation may be shortened by combining movements two and three. Thus, with regard to movement two the pad of paper may be picked up at its sides near the punched edge and with the punched edge away from the operator, the thumbs being below the pad and the finger tips above. As the pad is swung toward the machine it may be rotated away from the operator into a vertical position, with the back of the operator's left hand being used to push the operating lever rearwardly to accomplish the spreading of the binder element, a light pressure being adequate because of the linkage arrangement referred to above. The pad, as a continuation of this movement, may be rotated forwardly toward the operator with the upwardly and rearwardly projecting binding fingers being inserted in the respective punched holes. At the completion of this movement and as the pad of paper rotates downwardly toward the work table, the edge or base portion of either of the hands of the operator may be allowed to rest upon the release pads. This, as stated, triggers the mechanism to cause immediate recurling of the binding fingers and simultaneous release of the hooks so that the completed binder may be drawn away from the machine without delay.

In the above discussion, attention has been restricted to the assembling of a booklet although it will be apparent that de-binding may be accomplished with equal facility, reference being made to Figs. 16 to 18. In Fig. 16 a booklet is shown in position on the work table, having been lowered over and registered with the teeth of the comb member. In accordance with one of the aspects of the invention provision is made for manual engagement of the hook bar independently of the hook setting member 61 on the work table, enabling the hooks to be set even though the member 61 is covered by an assembled binder. In the present instance, access to the hook bar is accomplished simply and effectively by extending the left hand end thereof outwardly of the top plate 33 in which it is slidable, the left hand end being bent downwardly as indicated at 55a in Fig. 17 to provide a convenient pushing surface in addition to limiting inward movement. With the assembled binder in place on the comb, pressure is applied by the operator to the portion 55a of the hook bar thus causing the hook bar to move inwardly for engagement between the hooks and the respective rings or fingers. Prior to pushing the hook bar inwardly the pressure of the right hand of the operator may be applied along the backing portion of the assembled booklet, although the sheets of bound paper will normally provide a stiffening and alining effect insuring that each of the rings is reliably and positively engaged by its corresponding hook. The next step is simply to push the operating handle backwardly until the comb assembly reaches its stop which, as previously noted, draws the binding rearwardly, uncurling the fingers about their respective hooks so that the tips are upwardly presented, whereupon the pad of paper may be removed. Complete de-binding requires substantially no more time than assembly, and it will be apparent that the present machine is ideally suited for changing pages in an assembled booklet, as for example, a catalogue or the like, on a production basis. As an added feature which is particularly useful in the de-binding operation, the teeth of the comb may be narrower at their tips so that the tips of the teeth may "find" the holes more readily and in spite of imperfect register. For example a tooth may be 1/4" wide at the base and 3/16" wide at the top.

The dog-leg construction of the operating arms 101 enables the above binding and de-binding procedure to be used even with bindings which may be longer than the nominal capacity of the machine. In such circumstances, the binding element is acted upon in sections with one end hanging outboard but free of interference from the operating handle. After a first section is treated, the element and paper partly assembled thereon is moved endwise for completion of the operation.

Having understood the operation of the internal mechanism, attention may next be redirected to the construction of the housing. It is one of the features of the present device that the parts for operating and releasing both the comb and the hooks are included in a single subassembly including the top plate 33. Thus it will be recalled that both the main operating shaft 100 and the shaft 95 on which the comb assembly 35 is mounted are secured to a single pair of brackets 97, 98 integrally formed on the underside of the plate 33. Moreover, the hook bar 55 is mounted for endwise movement in a channel 75 formed in the lip portion of the plate 33. The hook-setting bar 61 and associated linkage and latching mechanism are all supported upon the same top plate 33. Of the movable elements, only the positioning cam 120 and its adjusting wheel are mounted on the housing.

Because of this novel unitary construction, assembly and disassembly of the mechanism with respect to the frame becomes a simple matter. Let it be assumed, for example, that the mechanism is to be removed for cleaning or other service. The bolt 159 (Fig. 10a) is removed, thereby freeing the release member 150. Next the tray 36 which is inset within the rear portion of the frame is removed to provide clearance. Following this, the screws 34 are readily unscrewed, and the handle 101 is withdrawn endwise, thereby freeing the top plate 33. Such plate with its operating mechanism is then drawn rearwardly and upwardly as shown in Fig. 10. The rearward movement serves to draw the release member 150 out from under the overhanging work table 31 while the upward movement lifts the mechanism bodily out of the housing. The operation takes only a few minutes and substantially all of the operating parts are then accessible for bench work.

The unit construction is particularly advantageous during the course of initial assembly since all of the parts may be mounted on the top plate, adjusted and checked, prior to installing the mechanism into the housing. Installation may thus be substantially the last step in the assembly line. This insures that the finish on the housing will be fresh and unscratched when the machine is packed for shipment, and the mechanics assembling the machine can devote all of their attention to the mechanism without having to concern themselves with protection of the housing.

Modified handle construction

While a single operating handle has been shown and will normally be considered adequate, it will be apparent that if desired, a similar handle may be provided at the right hand side of the machine which is simply a mirror image of the one shown and which is secured to the operating shaft 100 in the same way.

Alternatively, it may be desirable for added convenience to provide a bridging type operating member which bridges the comb and which is spaced upwardly therefrom, so that spreading pressure may be applied anywhere along the entire width of the machine. In this way the spreading may be accomplished by pressure applied by the back of either hand when the pad of paper is applied and without reference to lateral position. As shown in Fig. 19, the modified from of operating member indicated at 160 includes a pair of side arms 161, 162 which are integral with the comb. Interconnecting the top ends of the arms 161, 162 is a bridging bar 165 which is of rigid construction, so that the two arms and bridging member form a rigid unitary construction, resisting any relative twisting of the arms 161, 162 regardless of where operating pressure is applied.

For the purpose of providing access to the teeth of the comb and for "clearing" binder elements which are longer than the nominal width of the machine, both of the arms 161, 162 are formed of dog-leg shape as shown in Fig. 20. More specifically, the arms are bent back away from the plane of the comb, preferably below the base of the comb teeth, as indicated at 163. The arms then curve upwardly so that their end portions 164 lie approximately parallel to, but spaced backwardly from the comb. Regardless of whether the handle construction disclosed in Figs. 19-20 is used or whether the handle is constructed as described in the earlier embodiment, it is to be noted that rearward movement incident to spreading of the binder fingers causes the handle to be moved into an out of the way position so that it does not in any way interfere with the assembly of paper on the binding element.

Modified hook bar

In the hook bar described above the hooks are simply and conveniently staked into place in the bar in such a manner as to provide positive anchoring and to prevent relative rotation. If it is desired to make the individual hooks readily replaceable in the event of breakage, the construction shown in Figs. 21-24 may be employed. Here the hook bar indicated at 170 is channel shaped, having a front flange or edge 171 and a rear flange 172. To prevent rotation of the individual hooks each hook 173 has a square body portion 174 which fits into a registering square hole in the front edge 171 of the bar. To retain the hooks in their inserted position, each of the hooks has a detent button 175 formed at its tail end which is received in a star opening 176 formed in the rear flange 172. By properly dimensioning the star opening 176 with respect to the button 175, positive detenting action may be secured. A rigid final unit is produced although it will be apparent that any individual hook may be removed simply by overcoming the detent force, retracting it and inserting another to take its place.

Automatic adjustment of comb height

In the embodiment discussed in the preceding figures the comb 50 has a height of approximately 1¼" which is adequate to accommodate even the largest sizes of plastic binding elements in common usage. Such height can be tolerated since, as shown in Fig. 1b, and in Fig. 12, the present machine is operated with the hands in a normally curled, bridging position. It is, however, one aspect of the present invention to provide means for automatically adjusting the comb height to the minimum height required for accommodation of a binding of particular selected size, the adjustment being coordinated in a novel fashion with adjustment of the degree of the spread.

One scheme for accomplishing coordinated comb adjustment is set forth in Figs. 25-29 in a simplified, partially diagrammatic form in order to facilitate understanding. In these views the means for effecting rearward tilting of the comb and for effecting endwise movement of the hooks have been omitted, and it will be understood that such portions of the total device and any other elements not specifically set forth in these figures may correspond to those previously described in considerable detail. The elements shown in Figs. 25-29 which have counterparts in the preceding embodiments will be given the same reference character with the suffix "a."

Referring more specifically to the drawings, the construction includes a comb assembly 35a which is pivoted in slidable bearings 95a for rearward rocking movement. Such comb assembly has a cylindrical top surface 201 having a slot 202 through which the comb, indicated at 50a, projects. For guiding the comb assembly 50a for vertical movement within the slot 202, guide members 203 are provided at the lower end of the comb.

In accordance with one of the aspects of the present invention, a single adjusting means is provided for adjusting both the degree of extension of the comb 50a and the limits of rearward movement of the comb assembly 35a, such adjusting means being capable of operating independently of the rearward swing of the comb assembly 35a. This result is achieved in the present device by utilizing, for adjustment purposes, a central shaft which is coaxial with respect to the comb assembly 35a, such shaft being indicated at 205. Mounted at the outboard end of the shaft is an adjusting knob 123a calibrated in terms of the standard sizes of binding elements. To project the comb 50a, spaced racks 206, 207 are provided, one adjacent each end of the shaft and respectively engaging pinions 208, 209 secured to the shaft.

For adjustably limiting rearward rocking of the comb assembly an adjusting slide 210 is provided mounted in suitable slide-ways 211, 212 in the frame of the machine and having upwardly extending abutment 213. A stop surface 214 is provided on the comb assembly 35a for engaging the abutment.

The operation of the above will be made clear upon comparing Figs. 25 and 27. Fig. 25 shows a binding element of small diameter, for example, ¼", seated in the comb with the adjusting knob 123a set in the ¼" mark. It will be noted that the comb projects only a sufficient distance to engage the backing of this small diameter binding. The hooks in the hook bar 55a are then "set," i.e., engaged with the respective rings, by the hook setting means previously described, for example, in connection with Figs. 4 and 5. Rearward pressure is then applied to the handle 101a which serves to rock the comb assembly backwardly via a linkage corresponding to that previously described and including a curved link 111a, the upper end of which is shown, for example, in Fig. 25. Such movement is continued until the rear end of the surface 214 strikes the adjustably mounted abutment 213, at which point the binding element is spread just the right amount. The punched paper is then threaded onto the fingers of the binding element, following which the mechanism is tripped so that the parts are restored to the position shown in Fig. 25, completing the binding operation.

Where it is desired to employ the same machine for a larger size binding element, for example, 1⅛" in diameter, the adjusting knob is simply moved into the 1⅛" setting. This produces rotation of the shaft 205 which is accompanied by upward movement of the comb 50a and forward movement of the stop member 210. In this position the comb is extended an adequate amount to accommodate the large binding, and the abutment 213 is positioned so as to allow additional rearward rocking of the comb assembly before the limit position is reached (Fig. 29).

The advantages of the above arrangement will be apparent to one skilled in this art. In the first place the comb, in the case of small sizes of bindings, which comprise the bulk of the work, will be lowered into a more out-of-the-way position providing minimum interference with the hands of the operator. When it is necessary to use large size binding a single adjustment suffices to extend the comb the appropriate amount.

Where still further flexibility is needed, i.e., where it is desired to have the comb and degree of spread subject to separate adjustment for any reason whatsoever, the arrangement shown in Figs. 30–32 may be employed. These figures have been simplified for ready understanding and the same comments are applicable as in the case of Figs. 25–29. Elements finding counterparts in the first described embodiment have been indicated by the same reference numerals with the addition of the suffix "*b*." Here the comb assembly 35*b* has an arcuate supporting surface 221, and a slot 222 through which the comb 50*b* extends upwardly, the lower end of the comb 50*b* being guided by guide ways 223 which form an integral part of the comb assembly. The comb assembly is rotatable on suitable bearings at the ends thereof, as, for example, indicated at 95*b*. For the purpose of adjusting the degree of rearward rocking movement, a concentric shaft 225 is used which is coupled to an adjusting knob 123*b* located at the left hand end of the machine. Engagement between such shaft and the comb is provided by a pinion 229 which engages a rack member 230 mounted in slideways 231, 232. Forming an integral part of the rack member 230 is a stop 233 which is arranged in the path of movement of a stop surface 234 on the comb assembly.

For the purpose of adjusting the degree of extension of the comb 50*b*, a separate adjusting knob 240 is provided at the right hand side of the machine coupled to a hollow shaft 241 which is telescoped over the shaft 225 previously referred to. For coupling the shaft 241 to the comb, the comb is provided with racks 246, 247 engaging pinions 248, 249, the setting of the adjusting knob thus determining the degree of extension of the comb 50*b*.

During normal use of the device shown in Figs. 30–32, each of the knobs will be set to the same nominal setting, thereby providing both the appropriate degree of comb extension and the appropriate degree of spread. Where it is desired under special circumstances to increase the projection of the binder fingers bit by bit in order to accommodate a larger amount of paper, the adjusting knob 123*b* may be rotated in the direction of a lower nominal setting. This will produce a camming action on the comb assembly, causing the latter to be rocked forwardly through a small angle and proportionately increasing the upstanding length of the binder fingers.

*Alternative form of thumb operator*

In the embodiment described above the thumb bar is mounted for movement rearwardly under the reaction of thumb pressure, and this movement, through a parallelogram linkage, produces the desired setting movement of the hook bar 55. It has been found that a modified form of thumb bar may be used which takes advantage of the grasping movement of the operator's hand, and thus possesses some of the same advantages as the thumb bar arrangement described above, while nevertheless possessing certain additional advantages, the primary ones of which are simplicity, low cost, and a slight reduction in the operating force required. Thus, in carrying out the invention, we provide a thumb bar directly coupled to the hook bar and which is mounted for movement endwise, i.e., transversely of the machine, having one or more thumb-holds thereon arranged in the path of movement of the operator's thumb for operation coincidentally with the seating of a binding element in the comb. Turning to the drawings and particularly Figs. 33 and 34 there is shown a top plate assembly having a top plate 33*a* and which may be substituted for the top plate assembly previously described. Parts of such assembly which correspond to elements in the original version are given the same reference numerals with the suffix "*a*." Any parts not shown correspond to the preceding embodiment.

For the purpose of connecting the thumb bar 61*a* to the hook bar 55*a*, a slide member 250 is provided having a rearwardly extending arm 251. Such slide member is rigidly secured to the thumb bar 61*a* by means of screws 252, 253 which extend upwardly through suitable slots 254, 255 formed in the guide plate 58*a*. Such slots insure pure endwise movement of the thumb bar. The thumb bar occupies a normal left hand position under the influence of the spring 256. Arranged in the path of movement of the arm 251 is a pin 257 which is mounted on the underside of the hook bar 55*a*. Such a pin has a clearance hole 258 formed in the guide plate 58*a*. The hook bar itself is constrained to a left hand position by a spring 74*a*.

In accordance with one of the aspects of the invention the hook setting bar 61*a* has thumb-engaging abutments 261—263 thereon defining thumb-receiving recesses 264—266. The abutments are of one-way construction, being abrupt at their left sides and sloping at their right, so that lateral thumb pressure can be easily exerted in the hook setting direction but not in the opposite direction (see Fig. 36). In operation, the operator's right hand occupies the position shown in dot-dash outline in Fig. 33, the thumb being indicated at 267. Normal grasping pressure applied in the direction of the arrow has a component which causes the thumb bar 61*a*, along with its slide member 250, to move to the right causing the pin 257 on the hook bar to translate the hook bar in a direction to set the hooks. The hook bar is maintained in its set position by means of a latch 270 which engages a latch pin or pawl 271 which is mounted on the underside of the hook bar and which extends through an access opening 272 formed in the guide plate. Release of thumb pressure immediately enables the thumb bar 61*a* to return to its lefthand position with the hook bar being retained in latched position. It will be apparent that the thumb bar 61*a* may be operated with equal effectiveness by thumb engagement of the abutments 262 or 263, which are formed in exactly the same way as that previously discussed, the choice being left to the convenience and comfort of the operator. Aside from the difference in the direction of the net thumb pressure, the operating sequence is exactly the same as that previously described in connection with the earlier embodiment (Figs. 11–15).

One of the features contributing to the reliability of the operation is that the entire assembly may take place without movement of the pad of paper on the work table, either in assembling or disassembling a binder. Thus it is to be noted that the movement of the hooks occurs independently and without corresponding movement of either binder or pad and movement of the comb occurs independently leaving both of the hooks and the pad stationary. This is particularly desirable since it is the normal reaction of an inexperienced operator to press the pad onto the work table; doing so in this machine cannot possibly affect the result. It is moreover, one of the features of the present device that it may be operated efficiently by relatively unskilled help after only a single demonstration and without necessity for exercising particular care or particular skills.

Since the hook bar is restricted to slight endwise movement with all of the spreading movement being accomplished by the comb, the hooks which are a point of weakness in many commercial machines, may be made both short and strong with no limitation upon the effectiveness of the machine.

The movements required to operate the machine, as for example, the simple grasping movement which simultaneously seats the binding element against the comb and engages the hooks are natural movements which do not require skill and which may be repeated over and over again without fatigue.

It is to be particularly emphasized that the engagement of the hooks with the binder fingers and the subsequent spreading of the binder element are two separate operations, separately performed by the operator. This improves the reliability of the device since the initial hook setting operation must be entirely completed before the spreading begins. In normal operating sequence, both of the operator's hands are employed for seating the binding along its full length and it is not until after the hooks are set by the thumb reaction that the operator's hands are free to move the operating handle to spread the binding element.

The machine takes up minimum space on a table or desk and if desired for convenience the front edge of the machine may overhang the edge of the table by several inches.

The term "plastic binding machine" has been used in the claims simply for the sake of convenience to characterize a machine useful with a binder of the type shown in the above mentioned Douvry patent. It will be apparent to one skilled in the art that the machine is not limited to bindings made out of plastic, but is equally applicable to such bindings where made out of other resilient, yet reasonably stiff, material having the physical characteristics of plastic but manufactured out of metallic or non-metallic substances.

The term "uncurling" as applied to the fingers 42 shall be interpreted as the movement of the fingers which occurs during spreading, for example, to the extent shown in Fig. 1a in which the curvature is at all times partially preserved.

We claim as our invention:

1. In a plastic binding machine the combination comprising a frame having a work table, an upstanding comb member at the rear of said work table for supporting the backing portion of a binding element while permitting the fingers of the element to project forwardly therethrough, a hook bar having a set of hooks fixed thereon extending parallel to the comb and mounted for movement limited to endiwse movement of the hooks into engagement with the respective fingers, a hook setting member coupled to said hook bar and mounted on said work table forwardly of said comb, means for moving said comb so that the backing portion of the binding element is carried rearwardly with the tips of the binding fingers being restrained by said hooks and presented upwardly for assembly of punched paper thereon, means for latching said comb in its rearward position, a friction connection interposed between said comb member and said latching means so that the comb may be inched forwardly by said comb moving means in spite of latching by said latching means and means including a trip member for releasing said latching means and restoring the comb and hook bar to their initial positions for removal of the assembled binder from the machine.

2. In a plastic binding machine, the combination comprising a frame having a work table, an upstanding comb member at the rear of said work table for supporting the backing portion of a binding element while permitting the fingers of the element to project forwardly therethrough, a hook bar mounted in said work table for movement limited to endwise movement and having a set of hooks fixed thereon extending parallel to the comb for engaging said fingers respectively, a hook setting member arranged on said work table forwardly and substantially centrally of said comb and adjacent thereto for natural engagement by the thumb of the machine operator while his fingers are used to seat the backing portion against said comb, means operatively connecting said member to said hook bar for sliding the latter endwise to engage the hooks with the fingers of the binding element in response to movement of said hook setting member, means including an operating member for swinging said comb rearwardly about an axis spaced below said comb so that the backing portion of the binding element is carried rearwardly with the tips of the binding fingers being restrained by said hooks and presented upwardly for assembly of punched paper thereon, and means including a trip member for simultaneously restoring the comb and hook bar to their initial positions for removal of the assembled binder from the machine.

3. In a plastic binding machine the combination comprising a frame, means including an upstanding comb for supporting the backing portion of a binding element while permitting the fingers of the element to project forwardly therethrough, a hook bar having a set of hooks fixed thereon in front of said comb and mounted for movement limited to endwise movement of the hooks into the curled rings, a hook setting member coupled to said hook bar for moving the same, means including a manual operator for moving said comb away from said hooks so that the backing portion of the binding element is carried rearwardly with the tips of the binding fingers being uncurled and retained by said hooks and presented for assembly of punched paper thereon, an adjustable stop for said comb member for limiting the rearward movement thereof, means for latching the comb in its rearward operation, and means including a trip member for normally unlatching the comb and disengaging the hook bar for removal of the assembled binder from the machine, said latching means including a slidable connecting means constructed and arranged to permit said latching means to be overpowered by said manual operator for manual forward movement of the comb.

4. In a plastic binding machine, the combination comprising a frame having a work table, means including an upstanding comb mounted thereon for supporting the backing portion of a binding element while permitting the curled fingers of the element to project forwardly therethrough, a hook bar having a set of hooks arranged in front of the comb and extending parallel thereto, a thumb-operated hook setting member mounted on said work table forwardly of said comb, means operatively connecting said thumb operated member and said hook bar for providing relative engaging movement between the hook bar and comb for respective engagement of said curled fingers in response to operation of said thumb operated member, means for maintaining said hook bar stationary when said hooks are engaged with the fingers, said comb having such height as to be readily bridged by hands of the operator with the same in a normally extended grasping position, said thumb-operated member being movable rearwardly and so spaced from said comb as to be conveniently operated by the reaction pressure of at least one thumb of the machine operator as such operator uses his finger tips to apply seating pressure against the binding element, means including a manual operating member for spreading the comb from the stationary hooks so that the fingers of the binding element are uncurled with the tips thereof being presented for assembly of punched paper thereon, and means for restoring the comb and hook bar to their initial positions for removal of the assembled binder from the machine.

5. In a plastic binding machine, the combination comprising a frame having a work table, means including an upstanding comb mounted thereof for supporting the backing portion of a binding element while permitting the curled fingers of the element to project forwardly therethrough, a hook bar having a set of hooks in front of the comb and extending parallel thereto, a thumb-operated hook setting member mounted on said work table forwardly of said comb, means operatively connecting said thumb operated member and said hook for providing relative engaging movement between the hook bar and comb for respective hooked engagement of said curled fingers in response to operation of said thumb operated member, said comb having such height as to be readily bridged by hands of the operator with the same in a normally extended grasping position, said thumb-operated member being in the form of a transversely extending bar movable rearwardly for setting of the hooks and so spaced from said comb as to be conveniently operated by the reaction pressure of either thumb of the machine operator as such operator uses his finger tips to apply seating pressure against the binding element, first latch means for temporarily maintaining said hook bar in engaged position, means including a manual operating member for spreading the comb from the stationary hooks so that the fingers of the binding element are uncurled with the tips thereof being presented for assembly of punched paper thereon, second latch means for temporarily maintaining the hooks and binder in spread relation, and means associated with said work table for substantially simultaneously releasing said latches for removal of the assembled binder from the machine.

6. In a plastic binding machine, the combination comprising a frame having a work table forming the forward portion thereof and a receptacle forming the rear portion thereof and providing a supporting surface for binding elements, means including an upstanding comb arranged between said work table and said receptacle for supporting the backing portion of a binding element while permitting the curled fingers of the element to project forwardly therethrough, means providing a set of hooks arranged in front of the comb and extending parallel thereto, hook setting means for providing relative engaging movement between the hooks and the comb for respective engagement of said curled fingers, means for maintaining said hooks stationary when engaged with the fingers, said comb means being pivoted about a transverse axis for rearward movement from a loading position so that the backing portion of the binding element is carried rearwardly with the result that the tips of the binding fingers are uncurled about said hooks and presented upwardly for assembly of punched paper thereon, said comb means including a rearwardly extending arcuate apron portion extending under the forward edge of the receptacle and providing an effective extension of the surface of the latter so that binding elements stored in said receptacle may be drawn forwardly from the receptacle into seated position on said comb when the latter is in its forward loading position, and means for restoring both said comb and said hooks to their initial positions for removal of the assembled binder from the machine.

7. In a plastic binding machine, the combination comprising a frame having a work table forming the forward portion thereof and a receptacle for binding elements forming the rear portion thereof, means including an upstanding comb transversely arranged between said work table and said receptacle for supporting the backing portion of a binding element while permitting the curled fingers of the element to project forwardly therethrough, means providing a set of hooks arranged in front of the comb and extending parallel thereto, hook setting means for providing relative engaging movement between the hooks and the comb for respective engagement of said curled fingers, means for maintaining said hooks stationary when engaged with the fingers, said comb means being mounted for rearward movement so that the backing portion of the binding element is carried rearwardly with the result that the tips of the binding fingers are uncurled about said hooks and presented upwardly for assembly of punched paper thereon, said comb means including a forwardly extending apron portion for supporting the fingers as they are uncurled, and means for restoring both said comb and said hooks to their initial positions for removal of the assembled binder from the machine.

8. In a plastic binding machine, the combination comprising a frame having a work table forming the forward portion thereof and a receptacle for binding elements spaced rearwardly therefrom a comb support transversely arranged between said work table and said receptacle and having an upstanding comb for supporting the backing portion of a binding element while permitting the curled fingers of the element to project forwardly therethrough, a hook bar having a set of hooks arranged in front of the comb and extending parallel thereto, hook setting means for providing a relative engaging movement between the hook bar and comb for respective hooked engagement of said curled fingers, means for maintaining said hook bar stationary when said hooks are engaged with the fingers, said comb means being pivoted about a transverse axis and having a manual operator for imparting rearward rocking movement thereto so that the backing portion of the binding element is carried rearwardly accompanied by uncurling of the tips of the binding fingers about said hooks for assembly of punched paper thereon, said comb means including forwardly and rearwardly extending apron portions of generally arcuate cross section with the edges thereof underlying said work table and receptacle respectively for bridging the space between them regardless of the position of said comb, and means for restoring both said comb and said hook bar to their initial positions for removal of the assembled binder from the machine.

9. In a plastic binding machine the combination comprising a hollow frame of generally rectangular outline having a front edge, at least a portion of which is extended rearwardly to provide a work table, and also having an upstanding rear portion and two side portions to form an integral whole, a transversely extending top plate extending across the central portion of the frame and supported by the two side portions, a comb assembly having an upstanding comb arranged rearwardly of the top plate and parallel to it, a hook assembly having a series of hooks arranged along the rear edge of said top plate, means for imparting relative endwise hook-setting movement between said hooks and said comb, means for maintaining said hooks stationary when engaged with the fingers, means for thereafter imparting relative spreading movement therebetween for spreading the binding element, latch mechanism for temporarily retaining the members spread apart, trip means including a forwardly extending trip member having a trip pad arranged substantially flush with said work table, a removable tray supported by the rear portion of said frame rearwardly of the comb assembly for storage of binding elements preliminarily to bringing them into engagement with said comb, the operating, spreading and trip means being totally supported on said top plate for removal as a unit from said frame.

10. In a plastic binding machine the combination comprising a hollow frame of generally rectangular outline having a front edge, the central portion of which is extended rearwardly to provide a work table and also having an upstanding rear portion and two side portions to form an integral whole, a transversely extending top plate extending across the central portion of the frame and supported by the two side portions, a comb assembly having an upstanding comb arranged rearwardly of the top plate, and parallel to it, a hook assembly having a series of hooks interposed between the top plate and comb, means for imparting relative hook-setting movement between said hooks and said comb, means for maintaining said hooks stationary when engaged with the fingers, and means for imparting relative spreading movement therebetween, means for temporarily retaining the comb and hooks in their spread-apart relation, a trip mechanism having a depressibly mounted trip pad member extending transversely under said work table and having trip pads on said side of the work table substantially flush with the surface thereof.

11. In a plastic binding machine the combination comprising a frame providing a work support at the front portion thereof, a comb assembly at the rear edge of the work support, said comb assembly comprising an upwardly extending comb, means pivoting said comb assembly about an axis in said frame below and parallel to the comb for enabling the same to swing between a forward position in which the comb is upstanding and a rear position in which the comb is rearwardly inclined and restricting the same against endwise movement, a hook bar movably mounted at the rear edge of the work support and having a set of hooks with the tip thereof in alinement with one another and parallel to said comb for insertion into the respective fingers of a binding element seated on said comb, means restricting said hook bar to endwise movement and for maintaining said hook bar stationary when said hooks are engaged with the fingers and means for moving said comb from its forward position to its rear position for spreading of the binding element, said work support, said comb assembly, and said hook bar being constructed and arranged so that the engagement of the hooks and subsequent spreading by the comb as well as the corresponding reverse movements thereof may take place during binding of a pad of paper without any movement of the pad relative to the work support.

12. In a plastic binding machine the combination comprising a frame, means including an upstanding comb transversely arranged in said frame for supporting the backing portion of a binding element while permitting the curled fingers of the element to project forwardly in register with the comb teeth, a hook bar arranged in front of said comb and having a plurality of hooks thereon in register with the comb teeth, means including a slideway for said hook bar for effecting endwise movement thereof for engagement of the hooks with the curved fingers respectively and for restraining said hook bar against sidewise movement when the hooks are engaged with the fingers, means for relatively spreading the comb away from the hook bar with the result that the tips of the binding fingers are uncurled about said hooks and presented upwardly for assembly of punched paper thereon, said hooks being removably mounted in said hook bar with keyed non-rotative engagement between the hook bar and the shanks of said hooks respectively, each of said hooks having a detent means for retaining the hook in engagement with said hook bar and for providing seating engagement therewith so that each hook projects from the hook bar precisely the same amount when in seated position.

13. In a plastic binding machine the combination comprising a frame, an upstanding comb arranged transversely in said frame for supporting the backing portion of a binding element while permitting the curled fingers of the element to project forwardly in register with the comb teeth, means providing a set of hooks arranged in front of the comb teeth respectively, hook setting means for producing relative engaging movement between the hooks and the comb for respective hooked engagement of said curled fingers, means for maintaining said hooks stationary when engaged with the fingers, means for moving said comb relative to said hooks so that the tips of the binding fingers are uncurled about said hooks and presented upwardly for assembly of punched paper thereon, and means for effecting simultaneous coordinated adjustment of the height of said comb and the limit of spreading movement between said comb and said hooks.

14. In a plastic binding machine the combination comprising a frame, a comb assembly including a comb support pivoted at its lower end for rocking movement about a transverse axis in said frame and including a comb adjustably mounted in said support to provide an adjustable degree of upward extension of the comb, means providing a set of hooks arranged in front of the comb and in register with the respective teeth thereof, means for moving said hooks endwise for engaging the curled fingers of a backing element seated on said comb, means for maintaining said hooks stationary when engaged with the fingers, a rack on said comb, a pinion engaging said rack, a movable stop for limiting the degree of rearward rocking of the comb support, calibrated means for simultaneously adjusting the movable stop and the pinion so that the amount of spread and the degree of comb extension corresponds to that required for a binding element of a given size, said pinion being arranged coaxially with the axis of pivoting of said support.

15. In a plastic binding machine the combination comprising a frame, a comb support pivoted in said frame about a transverse axis for rocking movement, a comb mounted in said comb support and movable with respect to the latter to provide for adjustment of the height of the comb, said comb being so arranged as to support the backing portion of a binding element while permitting the curled fingers of the element to project forwardly in register with the comb teeth, means providing a set of hooks arranged in front of the comb teeth and extending parallel thereto, means for moving the hooks endwise for respective engagement with the curled fingers of the backing element, means for maintaining said hooks stationary when engaged with the fingers, an adjustable limit stop for limiting the amount of rearward rocking movement of the comb support so that the tips of the binding fingers are uncurled about the said hooks and presented upwardly for assembly of punched paper thereon, an auxiliary shaft concentrically arranged with respect to the transverse axis of pivoting of the comb support, and means for coupling said shaft to said comb so that relative movement between the shaft and the comb support produces an adjustment of comb height, and calibrated means for positioning said shaft relative to said frame.

16. In a plastic binding machine the combination comprising a frame having a work table, an upstanding comb member at the rear of said work table, a hook bar having a set of hooks extending parallel to the comb and mounted for limited endwise movement of the hooks, a hook setting member coupled to the hook bar and mounted on said work table forwardly of said comb, said hook setting member being substantially recessed in said work table so that a bound booklet may be threaded on said comb and seated flatly on said table, auxiliary operating means for said hook bar extending laterally of the confines of said booklet for operating said hook bar when a booklet is on said work table, means for maintaining said hook bar stationary when said hooks are engaged with the fingers, and means for moving said comb so that the backing portion of the binding element is carried rearwardly with the tips of the binding fingers being restrained by said hooks and uncurled for the removal of the punched paper comprising the booklet therefrom.

17. In a plastic binding machine the combination comprising a frame, a comb assembly including an upstanding comb for supporting the backing portion of a binding element while permitting the curled fingers of the element to project forwardly therethrough, means providing a set of hooks arranged in front of the comb and extending parallel thereto, hook setting means providing relative engaging movement between the hooks and the comb for respective engagement of said curled fingers, means for maintaining said hooks stationary when engaged with the fingers, said comb assembly being pivoted about a transverse axis for rearward movement from a loading position so that the backing portion of the binding element is carried rearwardly with the result that the tips of the binding fingers are uncurled about said hooks and presented upwardly for assembly of punched paper thereon, a cam arranged in the path of movement of the comb assembly, and means including a calibrated knob coupled to said cam to determine the point in the movement of the comb assembly at which bottoming takes place on said cam thereby to predetermine the degree of spread and consequently the degree of uncurling of the fingers of the binding element.

18. In a plastic binding machine the combination comprising a frame, an upstanding comb member extending transversely of said frame for supporting the backing portion of a binding element while permitting the fingers of the element to project forwardly therethrough, means providing a plurality of hooks extending parallel to the comb and mounted for limited endwise movement of the hooks into engagement with the respective fingers of the binding element, means for maintaining said hooks stationary when engaged with the fingers, means for moving said comb so that the backing portion of the binding element is carried rearwardly with the tips of the binding fingers being held captive by said hooks, and a stationary ledge member spaced below said hooks and extending slightly forwardly thereof for engaging the underside of the fingers as the same uncurl about said hooks incident to movement of the comb, the spacing between the hooks and the ledge member being such as to cause the fingers of the binding element to occupy a slightly curved position even when the same are substantially fully extended for assembly of punched paper thereon.

19. In a plastic binding machine the combination comprising a frame, an upstanding comb member extending transversely of said frame for supporting the backing portion of a binding element while permitting the fingers of the element to project forwardly therethrough, means providing a plurality of hooks extending parallel to the comb and mounted for limited endwise movement of the hooks into engagement with the respective fingers of the binding element, means for maintaining said hooks stationary when engaged with the fingers, means for moving said comb so that the backing portion of the binding element is carried rearwardly from a loading position with the tips of the binding fingers being held captive by said hooks, and a stationary ledge member spaced below said hooks and extending forwardly thereof for engaging the underside of the fingers as the same uncurl about said hooks incident to movement of the comb, the spacing between the hooks and the ledge member being such as to cause the fingers of the binding element to occupy a slightly curved position even when the same are substantially fully extended for assembly of punched paper thereon, the leading edge of said ledge member being formed with square teeth with the interdental spaces being in register with the teeth of the comb to permit the hooks to occupy a position closely adjacent the comb when the latter is in loading position.

20. In a plastic binding machine the combination comprising a frame, a comb support having an upwardly extending comb pivoted about a transverse axis in said frame arranged below and parallel to the comb for enabling the same to swing between a forward position in which the comb is upstanding and a rear position in which the comb is inclined rearwardly through a substantial angle, means providing a set of hooks arranged forwardly of said comb, setting means for imparting relative movement between the hooks and comb for engagement of the hooks with the curled fingers of a binding element seated in said comb, means for maintaining said hooks stationary when engaged with the fingers, a manual operating arm rigidly coupled to said comb support for moving said comb between its forward and rear positions, a ratchet mechanism coupled to said comb support and having a pawl for temporarily latching said comb in its rear position, and a friction connection interposed between the comb support and the ratchet mechanism so that the comb may be inched forwardly by said operating arm in spite of latching of the ratchet mechanism.

21. In a plastic binding machine the combination comprising a frame, an upstanding comb member transversely arranged in said frame for supporting the backing portion of the binding element while permitting the fingers of the element to project forwardly therethrough, means providing a plurality of hooks extending parallel to the comb and mounted for limited endwise movement of the hooks into engagement with the respective fingers of the backing element, means for maintaining said hooks stationary when engaged with the fingers, means for moving said comb so that the backing portion of the binding element is carried rearwardly with the tips of the binding fingers being held captive for uncurling by said hooks, said hooks being so constructed that the pressure of the fingers upon the hooks is concentrated at the outer ends of the latter for full seating of said fingers in said hooks.

References Cited in the file of this patent

UNITED STATES PATENTS

| | | |
|---|---|---|
| 2,334,815 | Emmer | Nov. 23, 1943 |
| 2,593,805 | Spinner et al. | Apr. 22, 1952 |
| 2,603,801 | Emmer | July 22, 1952 |

FOREIGN PATENTS

| | | |
|---|---|---|
| 728,421 | Great Britain | Apr. 20, 1955 |